(12) United States Patent
Ullom

(10) Patent No.: US 10,421,911 B2
(45) Date of Patent: Sep. 24, 2019

(54) DUAL STAGE, ZONE-DELINEATED PYROLYSIS APPARATUS

(71) Applicant: VADXX ENERGY LLC, Cleveland, OH (US)

(72) Inventor: William Ullom, Akron, OH (US)

(73) Assignee: VADXX ENERGY LLC, Cleveland, OH (US)

( * ) Notice: Subject to any disclaimer, the term of this patent is extended or adjusted under 35 U.S.C. 154(b) by 727 days.

(21) Appl. No.: 14/378,994

(22) PCT Filed: Feb. 15, 2013

(86) PCT No.: PCT/US2013/026412
§ 371 (c)(1),
(2) Date: Aug. 15, 2014

(87) PCT Pub. No.: WO2013/123377
PCT Pub. Date: Aug. 22, 2013

(65) Prior Publication Data
US 2016/0024390 A1    Jan. 28, 2016

Related U.S. Application Data

(60) Provisional application No. 61/599,206, filed on Feb. 15, 2012.

(51) Int. Cl.
*C10B 57/02* (2006.01)
*C10G 1/00* (2006.01)
(Continued)

(52) U.S. Cl.
CPC ............. *C10B 57/02* (2013.01); *C10B 47/30* (2013.01); *C10B 47/44* (2013.01); *C10B 53/07* (2013.01);
(Continued)

(58) Field of Classification Search
CPC .. C10B 57/02; C10B 1/00; C10B 1/02; C10B 1/08; C10B 5/00; C10B 7/10;
(Continued)

(56) References Cited

U.S. PATENT DOCUMENTS

| 595,780 A | 12/1897 | Krisan |
| 1,756,378 A | 4/1930 | Oberhuber |

(Continued)

FOREIGN PATENT DOCUMENTS

| CN | 1752184 A | 3/2006 |
| CN | 102015969 A | 4/2011 |

(Continued)

OTHER PUBLICATIONS

Notice of Allowance from U.S. Appl. No. 13/735,677 dated Jul. 23, 2015.

(Continued)

*Primary Examiner* — Jonathan Miller
(74) *Attorney, Agent, or Firm* — Calfee Halter & Griswold LLP

(57) ABSTRACT

An apparatus for continuous conversion of hydro carbonaceous materials to condensable, non-condensable and solid hydrocarbon products, comprising at least one extruder capable of providing shear force and heat and having three or more treatment zones, a continuous process thermal kiln reactor, said extruder and said kiln reactor being in fluid communication, means for transporting hydro carbonaceous materials through the apparatus, and between said extruder and said kiln reactor, means for feeding said hydrocarbonaceous materials to the apparatus, means for heating said hydrocarbonaceous materials, means for removing vapor products from said apparatus, means for removing solid products from said apparatus, and means whereby said hydrocarbonaceous materials are maintained within the (Continued)

zones for a range of defined temperature and residence times, wherein said extruder has at least three zones, and said kiln reactor comprises at least two zones, whereby said hydrocarbonaceous material is subjected to a plurality of defined temperature ranges and residence times.

18 Claims, 4 Drawing Sheets

(51) Int. Cl.
| | |
|---|---|
| C10G 1/02 | (2006.01) |
| C10G 1/08 | (2006.01) |
| C10G 1/10 | (2006.01) |
| C10B 47/30 | (2006.01) |
| C10B 47/44 | (2006.01) |
| C10B 53/07 | (2006.01) |

(52) U.S. Cl.
CPC .............. *C10G 1/002* (2013.01); *C10G 1/02* (2013.01); *C10G 1/086* (2013.01); *C10G 1/10* (2013.01); Y02P 20/143 (2015.11)

(58) Field of Classification Search
CPC ......... C10B 31/00; C10B 31/12; C10B 37/00; C10B 37/04; C10B 47/18; C10B 47/30; C10B 57/005; C10B 57/06; C10B 57/12
See application file for complete search history.

(56) References Cited

U.S. PATENT DOCUMENTS

| | | | |
|---|---|---|---|
| 2,812,200 A | 4/1930 | Oberhuber | |
| 2,636,202 A | 4/1953 | Hinzman | |
| 3,364,187 A * | 1/1968 | Wiggill | C08F 8/00 264/211.23 |
| 3,862,265 A * | 1/1975 | Steinkamp | B29C 47/1063 264/331.17 |
| 3,900,912 A | 8/1975 | Lenz et al. | |
| 4,098,649 A * | 7/1978 | Redker | C10B 7/10 201/2.5 |
| 4,303,477 A | 12/1981 | Schmidt et al. | |
| 4,686,008 A | 8/1987 | Gibson | |
| 4,781,796 A * | 11/1988 | Bridle | C02F 11/10 202/112 |
| 5,004,533 A | 4/1991 | Kalnes et al. | |
| 5,032,185 A | 7/1991 | Knapp | |
| 5,389,691 A | 2/1995 | Cha et al. | |
| 5,400,456 A | 3/1995 | Skibowski | |
| 5,470,384 A | 11/1995 | Cha et al. | |
| 5,565,161 A | 10/1996 | Auda et al. | |
| 5,566,416 A | 10/1996 | Karls | |
| 5,836,524 A | 11/1998 | Wang | |
| 5,903,946 A | 5/1999 | Collins et al. | |
| 5,954,949 A * | 9/1999 | Ohsol | C10B 55/00 208/131 |
| 6,070,285 A | 6/2000 | Geppert | |
| 6,126,907 A * | 10/2000 | Wada | C10B 7/10 110/246 |
| 6,172,275 B1 | 1/2001 | Tadauchi et al. | |
| 6,173,469 B1 | 1/2001 | Laymon | |
| 6,308,363 B1 | 10/2001 | Lino et al. | |
| 6,500,271 B1 | 12/2002 | Moore et al. | |
| 7,101,463 B1 | 9/2006 | Weinecke | |
| 7,344,622 B2 | 3/2008 | Grispin | |
| 7,490,381 B1 | 2/2009 | Franzino | |
| 7,681,634 B2 | 3/2010 | Botnmark et al. | |
| 7,893,307 B2 | 2/2011 | Smith | |
| 8,051,523 B1 | 3/2011 | Franzino | |
| 8,011,052 B2 | 9/2011 | Kapustin et al. | |
| 8,192,587 B2 | 6/2012 | Garrison et al. | |
| 8,225,809 B2 | 7/2012 | Krywitsky | |
| 8,239,994 B2 | 8/2012 | Dyck | |
| 8,316,500 B2 | 11/2012 | Freeman et al. | |
| 8,479,345 B2 | 7/2013 | Ludlow et al. | |
| 8,650,694 B2 | 2/2014 | Pruett et al. | |
| 8,739,345 B2 | 6/2014 | Palmer | |
| 9,150,791 B2 * | 10/2015 | Ben-Tovim | C10B 47/30 |
| 9,222,612 B2 | 12/2015 | Ullom | |
| 2003/0130548 A1 | 7/2003 | Lemmons et al. | |
| 2006/0280669 A1 | 12/2006 | Jones | |
| 2007/0113362 A1 | 5/2007 | Lino et al. | |
| 2008/0135244 A1 | 12/2008 | Miller | |
| 2009/0007484 A1 * | 1/2009 | Smith | C10B 47/44 44/606 |
| 2009/0031615 A1 | 2/2009 | Joshi et al. | |
| 2009/0227823 A1 | 9/2009 | Huber et al. | |
| 2010/0180391 A1 | 7/2010 | Pruett et al. | |
| 2010/0237291 A1 | 9/2010 | Simmons et al. | |
| 2011/0089015 A1 | 4/2011 | Kelley | |
| 2011/0114467 A1 | 4/2011 | Kelley | |
| 2011/0154592 A1 | 6/2011 | Woo | |
| 2012/0017385 A1 | 1/2012 | Palmer | |
| 2012/0017386 A1 | 1/2012 | Rankin et al. | |
| 2012/0017498 A1 | 1/2012 | Rugg | |
| 2012/0137458 A1 | 6/2012 | Knapp | |
| 2013/0174363 A1 | 7/2013 | Ullom | |

FOREIGN PATENT DOCUMENTS

| | | |
|---|---|---|
| DE | 19724147 A1 | 12/1998 |
| EA | 008993 B1 | 10/2007 |
| EP | 1405895 A1 | 4/2004 |
| EP | 1647589 A2 | 4/2006 |
| EP | 1105224 B1 | 5/2007 |
| JP | H06256769 A | 9/1994 |
| RU | 2149047 C1 | 5/2000 |
| RU | 2217468 C1 | 11/2003 |
| RU | 2326926 C2 | 9/2005 |
| RU | 2320699 C1 | 3/2008 |
| RU | 96217 U1 | 7/2010 |
| RU | 2421502 C1 | 6/2011 |
| RU | 2436851 C2 | 12/2011 |
| UA | 50430 U1 | 6/2010 |
| WO | 2002026914 A2 | 4/2002 |
| WO | 2006092306 A1 | 9/2006 |
| WO | 2008058137 A2 | 5/2008 |
| WO | 2011035812 A1 | 3/2011 |
| WO | 2012093079 A2 | 7/2012 |

OTHER PUBLICATIONS

First Office Action from Chinese Patent Application No. 201380009739.2 dated Jun. 5, 2015.
First Office Action from Chinese Patent Application No. 201380008981.8 dated Jul. 2, 2015.
Search Report and Written Opinion from Singapore Application No. 11201404709R dated Aug. 17, 2015.
Extended European Search Report from Application No. 13749308.6 dated Oct. 7, 2015.
European Search Report from Application No. 13747008.4 dated Dec. 9, 2015.
Office Action from U.S. Appl. No. 14/936,028 dated Sep. 23, 2016.
First Office Action from Chinese Application No. 201510301167.6 dated May 25, 2016.
Extended European Search Report from Application No. 13747008.4 dated Mar. 31, 2016.
Extended European Search Report from Application No. 15179432.8 dated Feb. 24, 2016.
Examination Report No. 1 from Australian Application No. 2013216895 dated Oct. 25, 2016.
Communication Pursuant to Article 94(3) from European Application No. 13749308.6 dated Dec. 6, 2016.
Second Office Action from Chinese Application No. 201510301167.6 dated Mar. 17, 2017.
English Translation of Office Action from Israeli Application No. 234,110 dated Jul. 31, 2016.
Office Action from Russian Application No. 2014134429 dated Jan. 18, 2017.

(56) References Cited

OTHER PUBLICATIONS

Examination Report from Singapore Application No. 11201404709R dated Mar. 14, 2016.
Office Action from U.S. Appl. No. 14/377,429 dated Mar. 9, 2017.
Tanida, et al. "Particle Motion in Screw Feeder Simulated by Discrete Element Method" IS&Ts NIP 14, 1998 International Conference on Digital Printing Technologies (1998), Web. Feb. 28, 2017, pp. 429-431.
Screw Conveyor Corporation "Catalog and Engineering Manual" 2010, p. 11 <http://www.screwconveyor.com/assets/1/7/Engineering_Catalog_1-2010.pdf>.
Ustinov, Accounting Chemistry of the Process When Selecting the Temperature Regime in the Pyrolysis Unit, Electronic Scientific Journal "Oil and Gas Business", 2011, No. 3, pp. 208-214, English Abtract (8 pages).
International Search Report and Writtan Opinion from PCT/US2013/026412 dated Apr. 19, 2013.
International Preliminary Report on Patentabiiity from PCT/US2013/026412 dated Aug. 19, 2014.
International Search Report and Written Opinion fromPCT/US2013/025335 dated Apr. 23, 2013.
International Preliminary Report on Patentability from PCT/US2013/025335 dated Aug. 12, 2014.
Non Final Office Action from U.S. Appl. No. 13/735,677 dated Nov. 26, 2014.
Response to Office Action from U.S. Appl. No. 13/735,677 dated Mar. 26, 2015.

\* cited by examiner

DUAL STAGE, ZONE-DELINEATED PYROLYSIS APPARATUS

CROSS-REFERENCE TO RELATED APPLICATION

This application is the U.S. national phase entry of PCT/US2013/026412, with an international filing date of 15 Feb. 2013, which claims the benefit of U.S. provisional application Ser. No. 61/599,206 with a filing date of 15 Feb. 2012, the entire disclosures of which are fully incorporated herein by reference.

BACKGROUND OF THE INVENTION

The present invention relates to an improved apparatus for the conversion of polymer waste in successive process environments, in solid and/or liquid form, herein interchangeably described as hydrocarbonaceous material, polymer waste and/or polymeric material, to condensable, non-condensable and solid hydrocarbon products. Condensable hydrocarbon products include synthetic petroleum and a variety of its fractions including but not limited to light sweet crude oil, fuel additives, base oil, slack wax, paraffin wax, microcrystalline wax and condensate dominated by aromatic petroleum hydrocarbons. The non-condensable hydrocarbon product is a gas. Solid hydrocarbon products include finely divided carbon char. In particular, the invention is an improved zone-delineated apparatus incorporating shear force in addition to heat in its first stage, plus a large volume thermal reactor in its second stage. It has capability to simultaneously produce multiple products, one of which, a hard wax, is produced from the apparatus at temperatures lower than typical pyrolysis conversion temperatures.

Converting waste polymers to obtain useful end products via pyrolysis has been a goal sought by many, for many years. Prior art involving pyrolytic decomposition of polymers largely relies on batch, semi-batch or serial batch processes limited in commercially viable application by their operating complexity and inability to continuously process mixed, poorly sorted and/or contaminated polymer waste without fouling. Many claim that serial batch processes comprised of a series of batch reactors progressively operated in a set sequence are "continuous" merely because some product is constantly being discharged from one or more exit ports connected to the batch reactors by a manifold or other suitable exit configuration. Polymer conversion processes include the primary processes of chemical depolymerization, gasification with partial oxidation, and thermal cracking, including pyrolysis, either with or without catalytic cracking and reforming, as well as the secondary process of hydrogenation.

Chemical depolymerization has mainly been limited to decomposition of polyesters e.g. PET, and polyurethanes, with secondary application to polyamides, polycarbonates and polyacetals. This method is generally restricted to decomposition of condensation polymers, targeting monomer yield.

Gasification and partial oxidation of waste polymers typically targets production of mixtures of carbon monoxide and hydrogen generally known as syngas. Although partial oxidation can be a more efficient process than steam methane reformation in terms of reactor size and process rate, partial oxidation produces a lower comparative hydrogen yield. Little, if any, condensable hydrocarbon is produced.

Thermal cracking processes employ thermal decomposition resulting in complex mixtures. Reaction temperature, coupled with molecular retention times within respective desired temperature ranges, is the most significant reaction variable, influencing both polymer conversion and molecular distribution of conversion products. Accordingly, efficient control of reaction temperature and residence times is paramount in importance to maximize yield of the desired product mix. Batch, semi-batch and serial batch processes experience difficulty in efficiently achieving and maintaining control of reaction temperatures and residence times due to problems resulting from, among other things, inefficient heat transfer through the waste polymer as this polymer appears to exhibit poor thermal conductivity. Unlike continuous processes, which achieve a dynamic process equilibrium thereby maintaining control of reaction temperatures and residence times, batch, semi-batch and serial batch processes are continually in a state of disequilibrium, posing chronic control challenges with every process cycle and acute problems of reactor fouling. Other variables, including catalysts, are optimizers; although catalytic cracking and reforming offers advantages of polymer breakdown at lower temperatures and higher rate with added control on product quality, catalytic cracking poses challenges including process complexity, deposition of residues hindering activity, poisoning of catalysts, high capital and operating cost of catalyst reactors, and cost of disposal of spent catalyst.

Hydrogenation is a basic step in petroleum refining and petrochemical production that has been applied to secondary processing of oil resulting from thermal cracking processes. This secondary method, often coupled with distillation, is employed in the production of petroleum-based fuels and process cuts where hydrogen saturation of olefins and removal of heteroatoms is required. The term "heteroatom" is understood to mean any atom that is not carbon or hydrogen, and has been applied to indicate that non-carbon atoms have replaced carbon in the backbone of the molecular structure or replaced hydrogen or alkyl groups bonded to the backbone of the molecular structure. Typical heteroatoms are nitrogen, oxygen, sulfur, phosphorus, chlorine, bromine, fluorine and iodine. Hydrogenation is a secondary process deployed in petroleum refining and petrochemical production. Hydrogenation is capital intensive, and can have high operating cost attributed to high pressure operation, cost of hydrogen, cost of removing waste heat, and other factors.

Prior art systems and processes have not achieved wide acceptance or success involving pyrolytic decomposition of polymers and this has been attributed to high operating costs, inability to consistently process contaminated waste streams and waste streams of varying composition, the prohibitively high cost or lack of market availability of uncontaminated raw material streams, inability to reliably and efficiently control temperature and pressure process conditions, inability to consistently supply adequate quantities of in-specification raw material to plants requiring high volumes of material to sustain operations, inability to control system fouling by char, terephthalic acid, benzoic acid, minerals, metals and the like, attempts to produce fuel having comparatively narrow ranges of market-driven specifications from widely varying raw material compositions, inability to control heteroatom content of product oil thus limiting market acceptance of the products, inability to consistently and effectively manage safety issues attributed to worker exposure to hazardous vapors and solids in every batch reactor cycle, and generation of hazardous waste including but not limited to char, waste water and off-specification hydrocarbonaceous liquids.

More specifically, prior art involving batch or semi-batch processes must overcome challenges of thermal inefficiency to promote conversion. Given that polymer waste has poor thermal conductivity, most batch reactor systems rely on some configuration of mixing elements within the reactor or complex arrays of raw material-containing cartridges placed into the batch reactor or concentric tubular devices containing raw material subjected to thermal energy or tubular heat transfer geometries deployed within the body of the batch reactor and the like, with the intent to increase raw material surface area, thereby increasing surface exposure to thermal energy which is otherwise poorly conveyed through material having poor thermal conductivity. The large number of batch reactor configurations that have sought patent protection is consistent with a broad-spectrum series of attempts to solve the heat transfer and process control challenges inherent to batch reactor systems. Complex mechanical and/or geometric solutions to the limitations are inherent to batch reactors.

Additionally, most if not all batch reactors, whether singly or in series, must be charged with hydrocarbonaceous raw materials, purged of atmospheric air containing oxygen, heated to the desired temperature when product vapors are extracted, then cooled to a temperature below flash point of the residual solids to facilitate their removal. The repeated thermal cycles experienced by these systems have poor thermal efficiency resulting in overconsumption of energy to complete the polymer conversion.

In an embodiment of the batch process, U.S. Pat. No. 8,192,587 to Garrison et al provides limited means of process control. In a batch reactor, all of the chemistries in the batch reactor described by Garrison are decomposed at successive times in the same three-dimensional space. Without the addition of the complex geometric means in Garrison to increase surface area available for heat transfer in a batch reactor by circulating heat transfer fluid through a sealed heating system, temperature control over the internal cross section of the reactor is poor because of poor thermal conductivity and varying material densities in the raw material charge. Such material densities change as conversions occur and mass is removed from the reactor via discharge of vapor. Moreover, poor thermal conductivity of polymer raw materials in a batch reactor, such as in Garrison, even with internal heat transfer fluids deployed results in varying degrees of raw material thermal transfer capacity across the complex cross section of the batch reactor. Additional complexity arises from change in thermal conductivity of the raw material as its composition changes as it decomposes. Further inefficiency in a batch reactor system such as in Garrison results from deposition of heavy oligomer, polynuclear aromatic hydrocarbons, asphaltines and/or char upon the surface of the internal heat transfer system and upon the surface of the reactor body itself, thereby offering an incomplete thermal conductivity solution to promotion of efficient heat transfer. As waste polymer decomposes in place in an unstirred reactor as described by Garrison, deposition of char on the internal surface of the reactor for much of the reactor cycle promotes formation and adsorption of aromatic and polynuclear aromatic hydrocarbons onto the surface of the char. Unless those aromatic and polynuclear aromatic hydrocarbons are removed from the char or unless this adsorption is prevented, disposal of the char created by the batch process can be rendered prohibitively expensive if it is characterized as a hazardous waste. As with all batch reactors, at the end of each process cycle, the char must be removed.

U.S. Pat. Nos. 5,389,961 5,740,384 to Cha et al describe a continuous, two-step thermal process for co-recycling scrap tires and oils. This prior art processes scrap tire with relatively large amounts of used motor oil, cylinder oil, vacuum tower bottoms and the like Cha describes a dual-reactor system operated in series whereby a transfer point between the two reactors is required to discharge un-reacted material from the first inclined reactor to the second horizontal reactor. This transfer point results in operational challenges as a result of fouling. Cha describes a cross-sectional shape of the dual-reactor system which provides for an open headspace through which un-reacted tire components, including steel fibers, could move, said open headspace posing a challenge to efficient transport of raw material up the incline of the first reactor. Cha describes operating the inclined reactor at increasing temperature, and operating the horizontal a higher temperature to drive off volatile hydrocarbons from the char.

U.S. Pat. No. 5,836,524 to Wang describes a process that processes solid polymer waste and used lubricating oils or recycled heavy oil in a single continuous step at relatively low temperatures. This prior art employs a continuous process inclined screw having no means for control in rate of temperature ramp and control of residence time. Wang recognizes that process yield is a function of temperature.

U.S. Pat. No. 6,172,275 to Tadauchi et al describes a pyrolysis method and apparatus for decomposing waste plastic which may contain organic chlorine. Tadauchi teaches the use of heating zones for decomposition of plasticizers and for dechlorination of halogenated polymer including polyvinyl chloride (PVC), by which the plasticizers can be decomposed to oil and hydrochloric acid, which can evolve from PVC. Both the oil and the hydrochloric acid are separately recovered. Tadauchi further describes condensation and isolation of wax from lighter molecules which may contain organic chlorine compounds, and further pyrolyzing of that wax fraction to light oil. Tadauchi teaches plasticizer decomposition and hydrochloric acid evolution, noting only that additional decomposition occurs at temperatures at or above 450° C. (842° F.) to produce a pyrolysis product, which can be light oil dominated by 4-15 carbon atoms. Tadauchi teaches that the material remaining after decomposition of plasticizers and recovery of hydrochloric acid are subjected to a pyrolysis process generally exceeding 450° C. (842° F.). Tadauchi describes a vacuum to remove hydrochloric acid from the plastic and increasing reactor pressure coincident with pyrolysis to shift molecular distribution toward lighter molecules having 4-15 carbon numbers.

U.S. Pat. No. 7,344,622 to Grispin describes what is called a continuous process wherein control upon the composition of liquids resulting from the thermal decomposition of polymer waste is achieved by maintaining a slow heating rate in the substantial absence of oxygen, creating a char bed having a thermal gradient. Grispin suggests that the nature of the char bed, reactor size, the amount of raw material charge, heating rate and the substantial exclusion of oxygen are simultaneously related to the composition of the product. The process described by Grispin operates by achieving a controlled single heat ramp for an optimal time period in a reactor targeting a relationship between reactor volume and reactor charge, to impact the composition of the oil formed thereby. Grispin's teaching is for a process for the production of aromatic fractions having 6-12 carbon numbers.

U.S. Pat. No. 7,893,307 to Smith describes a process whereby "hydrocarbon-formable materials, such as plastics and other waste or other recycled materials" are melted in a "viscous shear apparatus" such as an extruder and introduced into a device described as a "ribbonchannel" reactor wherein a cylindrical ribbon of melted plastic having a thin cross-sectional area is advanced and wherein pyrolytic decomposition of the plastic occurs. The intent of this design is to maximize surface area available to heating by exposing the thin body of melted material to a skin temperature far above that which is necessary to promote polymer decomposition, thus imparting a high thermal gradient to the material in the reactor. The temperature of melt exiting the viscous shear apparatus and entering the ribbonchannel reactor is claimed to range from about 238° C. (460° F.) to about 315° C. (600° F.). In the Smith process, effective dechlorination, if any, occurs between about 300° C. (572° F.) to about 365° C. (690° F.). Smith further discloses that residual material is discharged from the ribbonchannel reactor in a temperature range from about 524° C. (975° F.) to about 538° C. (1000° F.). To achieve decomposition in the ribbonchannel reactor, the skin temperature/heating element temperature of the ribbon channel reactor ranges from about 760° C. (1400° F.) to about 1315° C. (2400° F.) in an effort to efficiently heat the thin cross section of material filling the ribbon channel by maintaining a high temperature differential between the reactor skin and internal reactor temperature. This heating results in internal ribbonchannel reactor temperatures increasing from 338° C. (640° F.)-368° C. (694° F.) up to 393° C. (740° F.)-524° C. (975° F.) where pyrolytic decomposition is achieved, optionally in the presence of a melt-phase catalyst. Char material, dirt, and small pieces of metal are discharged at the end of the process about 524° C. (975° F.) to about 538° C. (10007). Smith's teaching is to a process throughput of 3,000 to 10,000 pounds per hour, and focuses on the geometry of the ribbonchannel reactor to optimize rapid heat transfer. The extruder and ribbonchannel reactor cannot accept particles larger than the clearance between the extruder screw and barrel, or the effective distance between the inner diameter of the outer heated cylinder and the outer diameter of the inner heated cylinder, whichever is smaller. In the exemplary case of rubber, Smith articulated far smaller particle sizes including crumb. Smith focuses only on providing a solution to effective heat transfer.

SUMMARY OF THE INVENTION

An apparatus and method of operation for continuous conversion of hydrocarbonaceous materials to condensable, non-condensable and solid hydrocarbon products, comprising an improved zone-delineated pyrolysis apparatus incorporating shear force in addition to heat in its first stage, plus a baffled, large volume and continuous process thermal kiln reactor in its second stage, means for transporting hydrocarbonaceous materials through the apparatus by an improved, zone-delineated extruder in its first stage and by advancing hydrocarbonaceous material in a zone-delineated thermal kiln reactor in its second stage, means for feeding and heating said hydrocarbonaceous materials whereby they are processed and pyrolyzed to produce vapor and solid products, wherein said screw means extends substantially the length of the first stage extruder and wherein said means of advancing hydrocarbonaceous material in the thermal kiln reactor extends substantially the length of the second stage thermal kiln, means for removing vapor products from said processed hydrocarbonaceous materials, means for removing solid products from said processed hydrocarbonaceous materials, means whereby said hydrocarbonaceous material is maintained within zones for a range of respective, defined residence times, means for rotating said extruder screw which has a plurality of flight configurations for feeding, compressing and dewatering, melting said hydrocarbonaceous materials to convert them from a solid to a liquid, for mixing, destabilizing and dehalogenating said hydrocarbonaceous materials, means for rotating said thermal kiln reactor, which has a plurality of internal fighting, baffle, blade and/or lifter configurations for further destabilizing said hydrocarbonaceous materials, for pyrolyzing said hydrocarbonaceous materials, for devolatilizing the pyrolyzed hydrocarbonaceous materials, for discharging produced vapors as well as recovery of condensable, non-condensable and solid hydrocarbon products.

In its first stage, the present invention comprises one or more parallel extruders capable of accepting hydrocarbonaceous material. Upon introduction into the extruder, the polymer waste is subjected to compression, dewatering, shearing, melting, destabilizing and dehalogenating prior to direct injection of dehalogenated and partially destabilized/decomposed hydrocarbonaceous melt into the second stage. The first stage is directly coupled to the second stage.

The second stage of the present invention comprises one or more counter-rotating thermal kiln reactors each having at least two chambers separated by an annular baffle dam, with each chamber operated at a different temperature. The hydrocarbonaceous material accumulates and continually destabilizes for a design-controlled residence time in the first chamber of the second stage prior to eventual passive discharge through a central opening in the baffle dam to the second chamber of the second stage. Important molecular cracking occurs in the later zone of the first chamber and the earlier zone of the second chamber. Final pyrolysis occurs in this second chamber of the second stage, and solid char residue is discharged from an end plate assembly at the termination of said second chamber.

The present invention provides for efficient conversion of widely variable raw material streams, highly contaminated raw material streams, and raw material streams having inconsistent compositions over time into condensable, non-condensable and solid hydrocarbon products having superior quality over products produced by pyrolysis systems described in the prior art.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
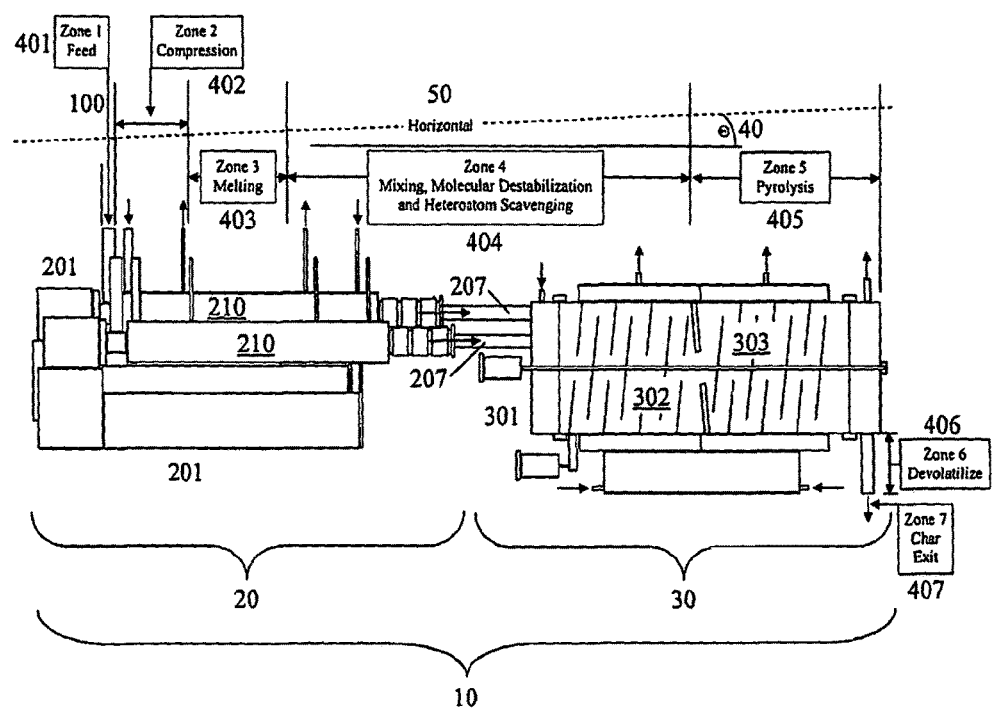
FIG. 1 is a schematic side view of a two-stage, zone-delineated continuous process pyrolysis apparatus in accordance with the present invention.

The present invention is a dual stage, zone-delineated continuous pyrolysis apparatus for continuous conversion of hydrocarbonaceous material in successive process environments. The present invention, one embodiment of which is illustrated in FIG. 1, comprises an improved zone-delineated apparatus 10 incorporating shear force in addition to heat, with integral and progressive additive introduction, steam removal and halogen acid removal in its first stage 20, plus a baffled, large volume and continuous process thermal kiln reactor in its second stage 30. The apparatus of the present invention and the method of operation for continuous conversion hydrocarbonaceous materials to condensable, non-condensable and solid hydrocarbon products have capability to simultaneously discharge end products both before and after an integral series of step-down condensers. It operates in a continuous manner. The present invention is sufficiently robust to accept shredded polymer waste including fractions of thermoset plastics that do not generally decompose to yield oil. Moreover, it is a modular and scalable pyrolysis apparatus capable of continually converting polymer waste and low-value or contaminated polymers to synthetic petroleum and a variety of its fractions, including but not limited to, light sweet crude oil, fuel additives, base oil, slack wax, paraffin wax, microcrystalline wax and condensate dominated by aromatic petroleum hydrocarbons. The non-condensable hydrocarbon product is a gas. The solid hydrocarbon product is a finely divided carbon char which may or may not contain non-polymer solids if such non-polymer solids are present in the raw material prior to its decomposition.

The present invention has the flexibility to allow, with optional capacity to produce and separately discharge, a primary microcrystalline or paraffin wax product having, collectively, 30-70 carbon atoms via direct discharge from the apparatus, in a preferred embodiment, at the end of the fourth of seven continuously operated, series-oriented process zones, hereinafter referred to as Zones. These Zones are the Raw Material Feed Zone or Zone 1 401, the Compression Zone or Zone 2 402, the Melt Zone or Zone 3 403, the Mixing, Molecular Destabilization and Heteroatom Scavenging Zone or Zone 4 404, the Pyrolysis Zone or Zone 5 405, the Devolatilization Zone or Zone 6 406, and the Char Discharge Zone or Zone 7 407. Specifically, this discharge of microcrystalline or paraffin wax product occurs after the Mixing, Molecular Destabilization and Heteroatom. Scavenging Zone 4 404, within a temperature range of 300° C. to 338° C. (572° F. to 690° F.), a temperature threshold not previously identified from which consistent yield of microcrystalline or paraffin wax product could be achieved. Further, in a preferred embodiment, it allows additional and simultaneous capacity to produce one or more additional, lighter fractions collectively having 4-30 carbon numbers recovered from separate discharge ports located in the fifth and sixth continuously operated, series-oriented process Zones, namely, the Pyrolysis Zone 5 405 and the Char and Residual Solids Devolatilization Zone 6 406, respectively, via subsequent recovery of pyrolysis vapor in a series of step-down condensers, with optional demisters in plurality with respective condensers when very highly efficient separation is required, operating at progressively colder operating temperature ranges. The apparatus requires no deployment of catalyst reactors and/or reflux reactors and/or fractionation columns, although the modularity and scalability of the apparatus of this invention provides opportunity for optional deployment of those additional devices when, for example, production of only light oil, diesel additive or gasoline additive is desired.

Raw material feed to first stage 20 of apparatus 10 can be a combination of mixed and/or varying solids. Varying proportions of petroleum-based liquids, if any as may be desired, can be injected into the first stage 20 and/or into the second stage 30, so long as the rate of injection of the liquid does not overtax the heating capacity of the second stage 30, As used herein "petroleum-based liquids" and "hydrocarbon liquids" will be used interchangeably and is meant to include used oil, waste oil, gasoil, refinery bottoms, cylinder oil, and the like. The process control provides for efficient conversion of widely variable raw material streams, highly contaminated raw material streams, and raw material streams having inconsistent compositions over time.

The apparatus of the present invention is modular and scalable in all aspects. For example, in an embodiment of the present invention as contemplated in FIG. 1 and FIG. 3, the number of parallel extruders 201 in first stage 20 of the present invention is a modular and scalable component of apparatus 10, providing opportunity to introduce and co-process multiple hydrocarbonaceous raw material feeds in a single system, each respective raw material feed introduced to and comingled in second stage 30 at potentially unequal rates, such rates which can be purposefully controlled and varied with respect to each other over time as may be desired.

Zone-delineated process control provides for efficient conversion of widely variable raw material streams, highly contaminated raw material streams, and raw material streams having inconsistent compositions over time. Clean, uncontaminated raw material feed streams are not required. Even contamination of the polymer waste by pesticides, herbicides, petroleum products, pharmaceuticals and the like is well tolerated. Certain characteristic and listed hazardous wastes can constitute or be included as a component of the hydrocarbonaceous raw material if the apparatus is operated pursuant to an EPA Permit to Operate a Hazardous Waste Storage, Treatment, and Disposal Facility.

The present invention provides improved zone-delineated conversion by continuous raw material feed through a staged apparatus 10 having progressive shear to non-shear environments as well as a progressive series of temperature ramps and soaks, one embodiment of which is illustrated in FIG. 1. The first stage 20 and second stage 30 operate in a continuous manner whereby hydrocarbonaceous material 100 is fed into the first stage 20, then partially processed hydrocarbonaceous material is continuously discharged from first stage 20 to second stage 30, from which synthetic petroleum and a variety of its fractions including, but not limited to, light sweet crude oil, fuel additives, base oil, slack wax, paraffin wax, microcrystalline wax and condensate dominated by aromatic petroleum hydrocarbons are discharged to condensers 80. The non-condensable hydrocarbon product is a gas. The solid hydrocarbon product is a finely divided carbon char plus recyclable metals and/or aggregates. This solid hydrocarbon product will also be described herein as "solid residue" or "solid products."

Many of the waxes discussed herein exit the thermal kiln reactor in a liquid phase, but tend to cool to a solid or slow-flowing liquid once collected. For this reason and for purposes of consistency and for purposes of this invention, wax and waxes, regardless of where they are recovered in the process, will be treated as solids, solid products, and/or solid residue(s), unless specifically indicated otherwise.

Figure 2:
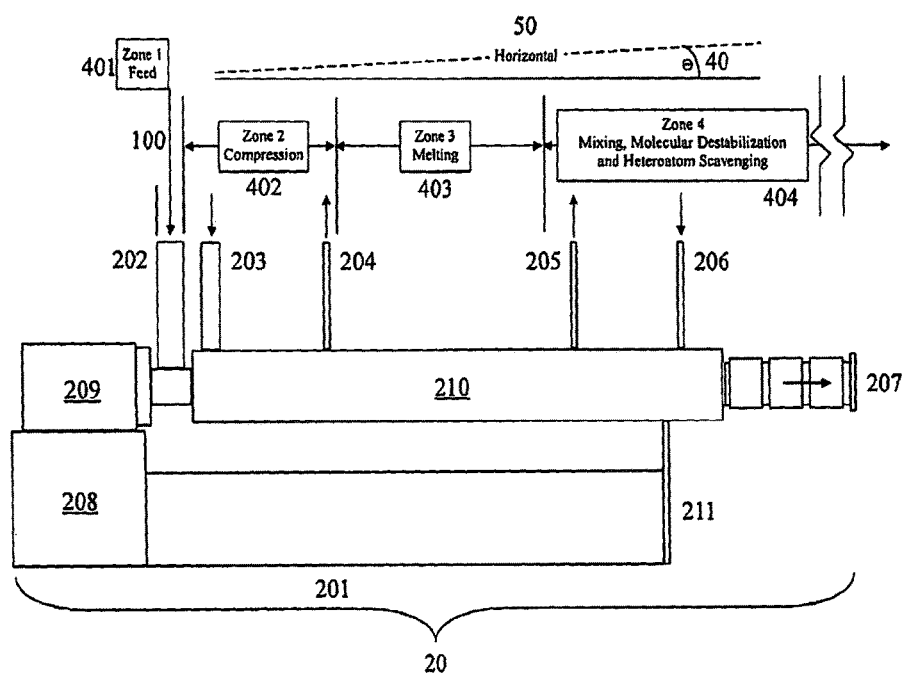
FIG. 2 is a schematic view of the first stage of the zone-delineated continuous process pyrolysis apparatus in accordance with the present invention.

Some or all of apparatus 10 may be deployed in an angled configuration 40, The entire apparatus 10 may be so angled, but the thermal kiln reactor 301 is the only component that requires this angled arrangement. In other words, in other embodiments the extruder 201 and other components may be horizontal, alternatively connected to a pitched or sloped thermal kiln reactor 301. In the embodiment of the present invention illustrated in FIG. 1, FIG. 2 and FIG. 3, the apparatus 10 is angled with a negative incline or slope, i.e. declining, with respect to the horizon 50, such that the entrance end of the thermal kiln reactor 301 is at a higher elevation that the exit end, allowing the force of gravity to assist in the transport of partially decomposed hydrocarbonaceous material through declining thermal kiln reactor 301 when the internal components of thermal kiln reactor 301 are configured to promote transport in concert with the force of gravity. The negative incline 40 can be between about 1° and about 20° off of horizontal 50, with the preferred negative incline being about 1.5° to about 6° off of horizontal 50. Alternatively, apparatus 10 or thermal kiln reactor 30 can also be oriented or pitched in the opposite or positive inclining direction when the internal components if thermal kiln reactor 301 are configured to physically advance the hydrocarbonaceous material, thereby overcoming the force of gravity, via rotation of the thermal kiln reactor 301. The positive incline 40 can be between about 1° and about 20° off of horizontal 50, with the preferred positive incline being about 1.5° to about 6° off of horizontal 50. This gives a possible range of between about −20° (decline) to about +20° (incline) with respect to the horizon 50.

Apparatus 10 is operated such that as the hydrocarbonaceous material and the products of decomposition are advanced through and subsequently discharged from the apparatus, the hydrocarbonaceous material passes through a series of successive process environments, also hereinafter referred to as Zones. An optimum product mix is achieved by determining and establishing a variety of progressive temperature zones to affect optimal temperature ramps, and by varying the internal design of extruder 201 and thermal kiln reactor 301 thereby controlling residence time within each respective temperature zone. This creates a plurality of temperature ramps and retention times (soaks) resulting in the apparatus of the present invention, which operates as a continuous process, having the thermal efficiency advantage of Zone-delineated conversion.

Shredded polymer waste 100, which may or may not be contaminated by non-polymer fractions, is continuously introduced to first stage 20 of apparatus 10. For this purpose, in addition to thermoplastic and thermoset plastics ("plastic"), "polymer waste" can include elastomers (or "waste elastomers") such as scrap tires, rubber residue, rubber belting, EPDM rubber sheet, membrane or extrudate, and the like. Mineral-based additives and/or melt-phase catalyst can also be added, if desired and at appropriate proportions to facilitate desired chemical reactions, to the extruder 201 at the beginning of the zonal sequence 401 (Zone 1). In addition, varying proportions of petroleum-based liquids, if any as may be desired, can be injected into port 206 in extruder 201 and/or into port 320 in thermal kiln reactor 301, so long as the rate of injection of the liquid does not overtax the heating capacity of the second stage 30.

As the raw material charge is advanced through the apparatus 10, phase change occurs as it is progressively compressed or otherwise experiences reduction in volume in Zone 2 402 to expel entrained atmospheric air and heated via a temperature ramp or gradient until entrained moisture in the polymer waste boils, resulting in steam formation, and subsequent melting in Zone 3 403. The melt is then heated in another thermal ramp and advanced through a mixing, molecular destabilization and heteroatom scavenging zone (Zone 4) 404 of controlled maximum temperature in the reactor. Mixing of the melt in this zone (Zone 4) 404 over a controlled residence time and temperature results in molecular destabilization, decomposition of cellulose to char and additional steam, decomposition of a number of plasticizers and organic additives to vapor recoverable as condensable petroleum product, near complete scavenging of sulfur, near complete reduction of the organic halogens chlorine and bromine, partial reduction of the organic halogen fluorine, and near complete reduction of terephthalic acid to benzoic acid and benzoic acid to benzene. Hard wax product can be discharged from Zone 4 404 at its termination and transition to Zone 5 405, Remaining melt which has not been discharged directly from the thermal kiln reactor at the termination of Zone 4 404 to recover hard wax is subsequently
advanced through yet another thermal ramp to a zone (Zone 5) 405 in which the majority of pyrolysis occurs. This pyrolysis occurs over a residence time optimized per category of raw material to be decomposed. Advancing the remaining mass through a Zone 5 405 environment of controlled maximum temperature and adequate residence time results in pyrolysis products of optimum yield and composition. As the remaining mass exits the pyrolysis zone 405, it experiences yet another thermal ramp at the introduction to Zone 6 406, thereby promoting devolatilization of the char and coking of residual aromatic hydrocarbons and polynuclear aromatic hydrocarbons over adequate residence time. Accordingly, after the residual solid moves from Zone 6 406 to Zone 7 407, it is continuously discharged from Zone 7 407 as thy and friable, finely divided, residual solid material, which is not saturated with adsorbed aromatic and polynuclear aromatic hydrocarbons. These remaining solids are continuously removed from the apparatus as char which may contain entrained metals (precious and/or nonprecious), glass, stones and the like if these contaminants are present in the raw material feed. Stated another way, "char" is carbon residue and residual solids other than carbon remaining from the decomposition of hydrocarbonaceous material.

In a variety of embodiments, extruder 201 and thermal kiln reactor 301 are designed to promote transport, mixing and reaction of a wide variety of raw hydrocarbonaceous materials. Thermal kiln reactor 301 can optionally include means to discharge paraffin or microcrystalline wax from thermal kiln reactor 301 at the termination of Zone 4 404. Condensable hydrocarbons are discharged from discharge port 323 located in Zone 5 405. Residual solid char is discharged from exit 319 in Zone 7 407. Internal design configurations of extruder 201 and thermal kiln reactor 301 are coupled with a plurality of temperature zones and respective residence times. As this is a single piece of equipment, operated in a continuous process, there may not necessarily be clear demarcations between Zones, such that one Zone might incidentally transition or overlap with the succeeding Zone.

The Zones are generally defined and/or delineated by the geometry of the screw in extruder 201, as well as the geometry and positioning of internal components of thermal kiln reactor 301 to establish desired respective Zonal residence times coupled with the respective operating temperature maintained in that Zone for each desired rate of process throughput. Design of a continuous process, Zone-delineated conversion apparatus is conducted to allow for construction of that apparatus having adequate but not unnecessary lengths at its respective diameters to promote adequate heat transfer to the hydrocarbonaceous material over the appropriate residence time in each Zone, thereby accomplishing the desired chemical reactions over required residence times to desired magnitudes of completion for the desired overall rate of process throughput. Preferably, continuous process components are designed in context of an interactive thermal and kinetic model incorporating variables including, among other things, reactor orientation, reactor length, reactor diameter, materials of reactor construction, extruder screw design, kiln internal components design, hydrocarbonaceous material throughput rate, density and thermal conductivity, kinetic viscosity, Zonal retention time, Zone pressure, inter-Zonal temperature ramp, etc. That model must have the capacity to forecast the outcome of operating the present invention to decompose any raw material composition which may be encountered with a desired or tolerable outcome. In the absence of such a model, an optimal geometry may or may not be derived from trial and error which can, especially in this context, have undesired or even catastrophic results.

Any embodiment of the present invention having process zones beginning with raw material introduction into the system (Zone 1 401), then proceeding with volume reduction and/or compression (Zone 2 402), the proceeding with raw material phase change to melt (Zone 3 403), then proceeding with decomposition of certain plasticizers and additives as well as evolution of hydrochloric acid, among other things, concurrent and/or subsequent molecular destabilization (Zone 4 404), then proceeding with pyrolytic decomposition (Zone 5 405), then proceeding with char devolatilization and/or coking (Zone 6 406), and ending with discharge of solid product (Zone 7 407) can be deployed to accomplish conversion of polymer waste in any configuration over a wide variety of scalabilities to accommodate all economically viable throughput solutions. The system embodied by the present invention is modular, scalable and versatile, being adaptable to applications having varied raw material compositions and desired throughput rates. Examples of the present invention's versatility include application of a Zone-delineated process to any system configuration. Note that while some but not all of the preferred embodiments of this invention are described in the following detailed descriptions of the invention, a variety of modifications and changes within the spirit of the invention will become evident to persons skilled in the art from disclosures made in the preceding and following detailed descriptions. Accordingly, the preceding and following descriptions are not limitative of the present invention.

It should be noted that in this application, the terms "thermal kiln reactor", "reactor", "retort" and "apparatus" are frequently used in similar context or interchangeably. In all cases, unless noted otherwise, these terms refer to the present invention.

The present invention, one embodiment of which is illustrated in FIG. 1, comprises an improved zone-delineated apparatus 10 incorporating shear force in addition to heat, with integral and progressive additive introduction, steam removal and halogen acid removal in its first stage 20, plus a baffled, large volume and continuous process thermal kiln reactor in its second stage 30.

In either the inclining or declining embodiment, in its first stage 20, the present invention comprises one or more extruders 201 each comprised of motor 208 and gear reduction assembly 209 with heated screw and barrel assembly 210 supported by frame 211. In cases when only one hydrocarbonaceous material stream is to be processed, or when multiple hydrocarbonaceous material streams having sufficiently similar physical and chemical properties are to be co-processed, a single extruder 201 can be employed in the preferred embodiment. However, in cases where two or more highly dissimilar hydrocarbonaceous material streams are to be co-processed in a single thermal kiln reactor, the preferred embodiment may utilize two or more extruders 201. In embodiments including more than one extruder, extruders 201 are connected in parallel, as opposed to sequentially or in series. This parallel arrangement of two or more extruders 201 has three primary advantages. First, it increases the amount or raw material that can be processed and fed into the system. Second, it allows for redundancy such that if one extruder 201 is down for maintenance, the system can still operate using the remaining extruder 201, albeit at half its intended total system operational capacity. Third, it provides flexibility by allowing simultaneous introduction of two completely different raw material streams into the reactor.

Extruders 201 are capable of accepting common or differing blends of hydrocarbonaceous raw material. This raw material is dominated by shredded polymers, including mixed and/or contaminated polymers. When additives or melt-phase catalysts are desired in the process, some or all of these can be added to the hydrocarbonaceous material prior to introduction of the hydrocarbonaceous material to extruder 201. The raw materials are subsequently compressed, sheared, melted, partially destabilized, desulfurized, and dehalogenated prior to direct injection of the dehalogenated, partially destabilized and partially decomposed hydrocarbonaceous melt into the second stage 30. Extruders 201 can accept and discharge respective differing blends of hydrocarbonaceous materials at different throughput rates, thereby providing process flexibility previously not experienced in the prior art. Common extruder dimensions, often described as the LID ratio or the ratio of barrel length to barrel diameter, normally deployed in industry for most applications range from 15 to 35, The LID ratio for extruder 201 is higher. Largely depending upon the desired feed rate and the effective rate of heat transfer to the hydrocarbonaceous material, the LID ratio for extruder 201 is between 35 and 75.

Shredded hydrocarbonaceous material is introduced into extruder 201 at feed opening 202. The extruder screw and barrel in feed Zone 1 401 is designed for the purpose of accepting shredded hydrocarbonaceous materials and transporting the hydrocarbonaceous materials to subsequent Zone 2 402 for compression. For purposes of describing the present invention, the ratio of depth of Zone 1 flights to Zone 4 flights is called the screw compression ratio. Extruder 201 has a compression ratio ranging from about 1.5:1 to 2.0:1 at the feed end to about 4:1 to 5:1 at the discharge end. Accordingly, design of the screw and barrel assembly in Zone 1 401 of extruder 201 incorporates a compression ratio between 1.5 and 2.2.

Optionally, when staged addition of additives and/or melt-phase catalysts is desired, these finely divided additives and/or melt-phase catalyst can be introduced to additive opening 203. These mineral-based additives are selected from one or more melt-phase heteroatom scavengers identified as the group consisting of alkali metals, alkaline earth metals, transition metals, post-transition metals and/or metalloids in a variety of forms. Melt-phase catalysts include but are not limited to oxides, hydroxides and/or carbides of the group consisting of alkali metals, alkaline earth metals, transition metals, post-transition metals, metalloids, nonmetals and/or naturally-occurring & synthetic silicate minerals.

The extruder screw and barrel in Zone 2 402 is designed for the purpose of compressing the shredded hydrocarbonaceous materials, heating the hydrocarbonaceous materials to a temperature sufficient to dehydrate the contents of Zone 2 402, evacuating steam at steam port 204, and transporting the hydrocarbonaceous materials to subsequent Zone 3 403 for melting. Accordingly, design of the screw and barrel assembly in Zone 2 402 of extruder 201 incorporates a compression ratio between 2.0 and 3.8. As the hydrocarbonaceous material is heated and compressed in a first temperature gradient, or thermal ramp, steam which evolves from dehydration of the hydrocarbonaceous material is discharged at the termination of Zone 2 402 from steam port 204. At the termination of Zone 2 402 within extruder 201, compression is relieved to materially decrease pressure via increase in the distance between the interior wall of the barrel and the root (shaft) of the screw, such that volatile steam can escape extruder 201 from steam port 204, but hydrocarbonaceous material will remain in extruder 20L Depending upon the nature of the hydrocarbonaceous material to be processed, the compression ratio beneath steam port 204 can be reduced to 1.0:1 to 2.0:1 or lower.

Downstream of steam port 204, the hydrocarbonaceous material is further compressed and heated in another thermal ramp under shear stress, promoting melting. The extruder screw and barrel in Zone 3 403 is designed for the purpose of melting hydrocarbonaceous materials under shear stress and direct heating, and to advance the hydrocarbonaceous materials to succeeding Zone 4 404. Accordingly, design of the screw and barrel assembly in Zone 3 403 of extruder 201 incorporates a compression ratio between 3.5 and 5.0. This shear stress is created by the interaction of the screw flighting in the extruders 201, the walls of the extruder 201 and viscosity of the molten hydrocarbonaceous material resulting in smearing and mixing of the hydrocarbonaceous material, Downstream of Zone 3 403, the hydrocarbonaceous material is further heated in another thermal ramp under shear stress, promoting highly efficient dehalogenation of the hydrocarbonaceous material. This dehalogenation results in the in situ formation of halogen acids and salts. These salts remain as a component of the hydrocarbonaceous material and are identified as melt-phase cracking catalysts, as are the halogen acids, which are created by operation of the extruder 201. The extruder screw and barrel in Zone 4 404 is designed for the purpose of mixing, destabilizing and dehalogenating the hydrocarbonaceous materials, evacuating halogen acids at halogen exit port 205, and transporting the hydrocarbonaceous materials to the continuation of Zone 4 404 in the thermal kiln reactor for further molecular destabilization. Accordingly, design of the screw and barrel assembly in Zone 4 404 of extruder 201 incorporates a compression ratio between 4.0 and 5.0.

Halogen acids are removed in their respective vapor phases from halogen exit port 205, as are the first commercially important petroleum hydrocarbon vapors that are produced by the apparatus from decomposition of certain plasticizers and additives. At the end of that portion of Zone 4 404 in extruder 201, compression is relieved to materially decrease pressure via increase in the distance between the interior wall of the barrel and the root of the screw, such that halogen acids and hydrocarbon vapors can escape extruder 201 from halogen exit port 205, but melted hydrocarbonaceous material will remain in extruder 201. Depending upon the nature of the hydrocarbonaceous material to be processed, the compression ratio beneath halogen exit port 205 can be reduced to 1.0:1 to 2.0:1 or lower.

Subsequently, the partially destabilized/decomposed and dehalogenated hydrocarbonaceous material is advanced in yet another thermal ramp under secondary shear stress, after which point additional additives, including but not limited to additional finely divided solids and/or hydrocarbon-based liquids, may optionally be added through injection port 206. In the preferred embodiment, any additional finely-divided solids are introduced to extruder 201 in the form of a heated slurry comprised of the finely-divided solids suspended in petroleum-based liquids having a boiling point greater than 690° F., more or less, such as asphalt and the like.

The first stage 20 is directly coupled to the second stage 30, such that the dehalogenated and partially destabilized/decomposed hydrocarbonaceous material is discharged directly from one or more connecting ports 207 to second stage 30. Connecting port(s) 207 are heated by electrical heaters or any other means standard in the industry to a temperature matching the Zone 4 operating temperature maintained in respective portions of extruder 201 and thermal kiln reactor 301 operated within Zone 4

In either the inclining or declining embodiment, in its second stage 30, the present invention comprises one or more rotating thermal kiln reactors 301 each having at least two adjoining chambers, 302, 303 operated at different temperatures, separated by an annular baffle dam 304. Thermal kiln reactor 301 is rotated via robust gear drive powered by motor and gear drive 314. Mixing and material advancement can be accomplished via internal screw fighting and/or baffles and/or mixing blades and/or lifters or any combination of these devices, collectively, mixing means 309, which is attached to the internal surface of thermal kiln reactor 30L In applications requiring an amount of mixing which cannot be realized from a thermal kiln reactor 301 not having a counter-rotating shaft with integral mixing means, thermal kiln reactor 301 can include an optional counter-rotating shaft 310 driven by motor 324 and running the length of the thermal kiln reactor 301 along its axis. Shaft 310 turns optional internal mixing blades 311 which are affixed to shaft 310. Bearing/end plate assembly 315 is stationary and holds the thermal kiln reactor 301 in place, allowing the thermal kiln reactor 301 to rotate, as well as allowing for introduction of liquid to thermal kiln reactor 301 at auxiliary injection port 320 integral to end plate 315. Bearing/end plate assembly 316 is stationary and holds the thermal kiln reactor 301 in place, allowing the thermal kiln reactor 301 to rotate, as well as allowing for continuous removal of vapor and char resulting from pyrolysis.

Baffle dam 304 is a cylindrical disc or plate with a central opening 305. Baffle dam 304 separates the first chamber 302 from the second chamber 303 of the thermal kiln reactor 301 and allows for the passage of optional shaft 310, when deployed, through baffle dam opening 305. Opening 305 allows hydrocarbonaceous material from the first chamber 302 to pass into the second chamber 303. The size of the opening 305 in baffle dam 304 in relation to operating feed rate through connecting port 207 dictates the maximum melt level that can be achieved in the first chamber 302 without creating a condition of rapidly increasing pressure. Design of apparatus 10 to allow for higher raw material throughput rates minimizing potential for pressure build-up in first chamber 302 will incorporate a larger opening 305 in baffle dam 304 such that the opening 305 in baffle dam 304 does not provide flow restriction. Design of apparatus 10 to allow for lower raw material throughput rates still minimizing potential for pressure build-up in first chamber 302 can optionally incorporate a smaller opening 305 in baffle dam 304, but the optional design feature of a smaller opening 305 is not necessarily required for raw material flow rates lower than design capacity of opening 305 in baffle dam 304 to allow unrestricted flow. Accordingly, if the option of a smaller opening 305 is not chosen in equipment design, the melt level in first chamber 302 cannot be maintained at the correspondingly higher level that would be experienced if the option of smaller opening 305 were chosen. For applications where increased pressure in first chamber 302 is desired and thermal kiln reactor 301 is constructed in such a way as to tolerate increased pressure in its interior, opening 305 would be sized to create the desired magnitude of restriction to melt flow passing through the opening 305.

Management of melt level in first chamber 302 requires balance between (i) pressure maintenance in first chamber 302 and (ii) feed rate of hydrocarbonaceous material though connecting port 207 to first chamber 302 and (iii) the viscosity of the melt in first chamber 302, all of which are to be considered in designing the size of opening 305 in baffle dam 304. Desired pressure control can be achieved by use of pressure control devices common in the industry. In the preferred embodiment, positioning of the pressure control device (not shown) is near auxiliary injection port 320 at the top of the end plate 315 integral to connecting port 207. Control of feed rate of hydrocarbonaceous material though connecting port 207 to first chamber 302 is accomplished by managing the feed rate to extruder(s) 201. Mitigation of melt viscosity can be achieved by injection of petroleum-based liquid at injection port 206 and/or auxiliary injection port 320. Greater reduction in melt viscosity is achieved by adding correspondingly larger amounts of petroleum-based liquid, although the addition of modest amounts of petroleum-based oil often results in material decrease in melt viscosity, especially if injected at injection port 206. Oil injection at injection port 206 will primarily result in reduction of melt viscosity, and secondarily result in expansion of melt passing through connecting port 207 with corresponding pressure increase in connecting port 207. If the melt level is higher than the top of the opening 305 in baffle dam 304, oil injection at auxiliary injection port 320 can be anticipated to primarily result in acute, rapid pressure increase in first chamber 302 and secondarily result in modest decrease in melt viscosity in first chamber 302. Such result is exacerbated if refinery overheads or similarly light petroleum fractions are injected, and mitigated if petroleum-based liquids having a boiling point greater than 690° F., more or less, are injected. If the melt level is lower than the top of opening 305 in baffle dam 304, oil injection at auxiliary port 320 can, depending upon the boiling point of the injected liquid, primarily result in mitigated yet acute and rapid pressure increase in thermal kiln reactor 301 with corresponding increase in vapor throughput velocity in downstream catalyst reactors and/or reflux reactors and/or fractionation columns (collectively, not shown), as well as condensers 80. A secondary result of this liquid injection can be modest decrease in melt viscosity in first chamber 302. Size design of opening 305 in baffle dam 304 must allow for reduction in cross sectional area of the opening 305 due to the passing of optional shaft 310, when deployed, through opening 305 in baffle dam 304.

Figure 3:
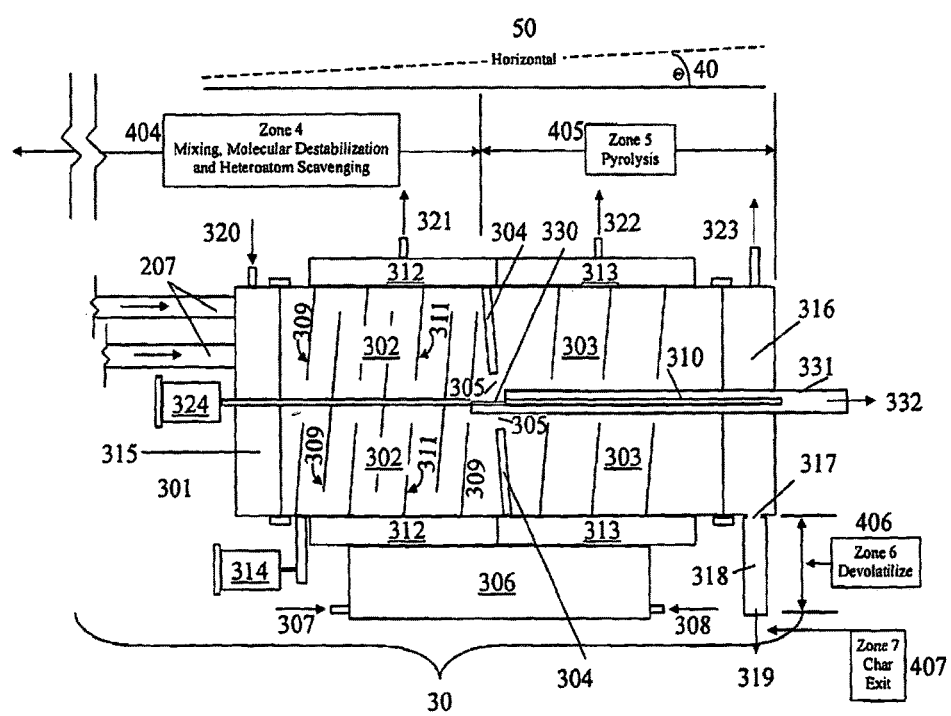
FIG. 3 is a schematic view of the second stage of the zone-delineated continuous process pyrolysis apparatus in accordance with the present invention.

The rotating thermal kiln reactor 301 is continuously fed hydrocarbonaceous melt through connecting port 207. The thermal kiln reactor 301 is heated either electrically or via direct combustion of non-condensable process gas and/or natural gas in two zones, or a combination thereof. The heating means is not critical, and can include direct-fired gas heating, electric heating elements, radiant heating, and thermal jacketing using heat transfer media known to the industry, including but not limited to, Dmvtherm®, molten lead, molten salt, molten sodium, and the like as may be appropriate for the respective zone temperature. FIG. 3 depicts an embodiment of the present invention incorporating the option of direct gas-fired heating of a first heating zone 312 corresponding to the first chamber 302 and a second heating zone 313 corresponding to the second chamber 303. Each of these heating zones is a jacket that surrounds the thermal kiln reactor 301 and heats its section respectively, via operation of gas burner array 306. Gas burner array 306 can be fired by non-condensable product gas recovered from gas discharge port 830 (FIG. 4), natural gas, or a blend of non-condensable product gas and natural gas introduced to one or more burner port(s) 307 and/or 308 as shown on the embodiment illustrated on FIG. 3. Two separate burner ports are not critical, as a single burner port could be used to introduce both gas streams.

The contents of the thermal kiln reactor can be mixed using one or more mixing means. One of these mixing means, comprised of screw fighting and/or baffles and/or mixing blades and/or lifters or any combination of these devices, collectively 309, is connected to the inner surface of the thermal kiln reactor 301. This first means can be augmented by an optional counter-rotating mixer within thermal kiln reactor 301. The counter-rotating mixer operates in the opposite direction to achieve the counter-mixing. In a preferred embodiment for applications requiring an amount of mixing which cannot be realized from a thermal kiln reactor 301 not having a counter-rotating shaft with integral mixing means 309, screw fighting, baffles, blades and/or lifters comprising mixing means 309 must be slotted to allow passage of blades 311 which rotate in the opposite direction. When counter-rotating shaft 310 and blades 311 are deployed, mixing means 309 must have slots which are appropriately spaced to avoid contact between mixing means 309 and 311.

Mixing of the melted hydrocarbonaceous material in first chamber 302 over a controlled residence time and temperature results in additional molecular destabilization, near complete reduction of organic halogens, and near complete reduction of terephthalic acid to benzoic acid and benzoic acid to benzene. Continuous introduction of dehalogenated and partially destabilized/decomposed hydro-carbonaceous material through connecting port 207 to first chamber 302 results in a dynamic equilibrium of accumulation and mixing of hydrocarbonaceous material over a design-controlled and specified residence time in first chamber 302 with continuous passive discharge of hydrocarbonaceous material through central opening 305 in baffle dam 304 to the second chamber 303 of second stage 30, The diameter of opening 305 in baffle dam 304 dictates the height of the spill point across which the hydrocarbonaceous material is advanced to second chamber 303 of second stage 30. Counter-mixing of the contents of the thermal kiln reactor, although a complex and costly embodiment, provides additional surface area within the thermal kiln reactor to promote heat transfer as well as the most thorough mixing. Optional counter-rotating mixing via 309 and 311 can be operated at the same or different relative speeds.

Melt-phase transition from residence in first chamber 302 to second chamber 303 coincides with the point of a thermal ramp, as final pyrolysis occurs in the second chamber 303 of the second stage 30. This pyrolysis occurs over a residence time optimized per category of raw material to be decomposed. Solid char residue accumulates at the bottom of bearing/end plate assembly 316 and is discharged from second chamber 303 through thermal kiln reactor port 317 to a heated devolatilization chamber 318. Devolatilization chamber 318 subsequently discharges the devolatilized char through char port 319 to a downstream char cooling system (not shown). Other embodiments (not shown) include removal of the char from the thermal kiln reactor 301 using screws to move the char to an exit at the central axis. Still other embodiments (not shown) include a channel at the lowest, terminal end, about the circumference of the thermal kiln reactor 301 that directs the char into exit ports.

Optional addition of hydrocarbon-based liquids may be accomplished for purposes including but not limited to desire to consume liquid hydrocarbonaceous material, desire to reduce melt viscosity and the like. Liquid can be introduced through injection port 206 and/or through one or more auxiliary injection ports 320. Similarly, water and/or steam sourced from steam removal port 204 and/or elsewhere may optionally be injected through one or more injection ports 206 and/or 320 in the interest of promoting the water-gas shift reaction. Optional addition of methane and/or non-condensable hydrocarbons taken as a fraction of non-condensable gases exiting a downstream condenser train can also be introduced through one or more additional auxiliary injection ports 320 to serve as carrier gas to transport hydrocarbon vapors from thermal kiln reactor 301 to vapor exit 323 and/or provide optional pressurization of the interior of thermal kiln reactor 301.

The present improved zone-delineated apparatus has capability to simultaneously produce multiple products, one of which, a hard wax, is produced from the apparatus at temperatures lower than typical pyrolysis conversion temperatures. This microcrystalline or paraffin wax product having, collectively, 30-70 carbon atoms, can be recovered via direct discharge of the molten wax from the thermal kiln reactor 301, in a preferred embodiment, at the termination of the Mixing, Molecular Destabilization and Heteroatom Scavenging Zone 404 within a temperature range of 300° C. to 338° C. (572° F. to 690° F.), a temperature threshold not previously identified from which consistent yield of microcrystalline or paraffin wax product could be achieved. The preferred embodiment to directly recover wax from the thermal kiln reactor 301 is optional and not necessary to the operation of thermal kiln reactor 301. This preferred embodiment is deployed when direct discharge of wax from thermal kiln reactor 301 is desired at the expense of liquid product recovery from condensers 80, product gas recovery from product gas discharge port 830 and char recovery from char discharge 319. Accordingly, total condensable product yield is higher when hard wax is recovered from the termination of the Mixing, Molecular Destabilization and Heteroatom Scavenging Zone 404 because pyrolysis of all the hydrocarbonaceous material does not go to completion, thereby reducing formation of non-condensable gas and char and increasing condensable product yield as material balance is conserved.

In one means of deployment of this preferred embodiment as depicted in FIG. 3, thermal kiln reactor 301 is angled with a negative incline or slope, i.e. declining, with respect to the horizon 50, such that the entrance end of thermal kiln reactor 301 is at a higher elevation that the exit end, allowing the force of gravity to assist in the transport of molten wax product recovered in catch trough 330 to exit via wax exit pipe 331 at wax discharge port 332 exiting end plate assembly 316. Catch trough 330 is located immediately beneath an opening cut into the top of wax exit pipe 331 situated in the longitudinal center of thermal kiln reactor 301. Wax exit pipe 331 is not present along the entire length of thermal kiln reactor 301, but only along the length of the second chamber, coincident with Zone 5 405. As thermal kiln reactor 301 rotates and the contents of the reactor boil, tumble, flow and fall vertically downward through the open headspace in rotating thermal kiln reactor 301, molten wax spills into catch trough 330, i.e. that portion of exit pipe 331 not cut away to make the opening. Catch trough 330 is located at the end of wax exit pipe 331 which is positioned such that catch trough 330 is located within central opening 305 to baffle dam 304, thereby capturing the melt, constituting microcrystalline or paraffin wax, at the transition from Zone 4 404 to Zone 5 405. Catch trough 330 is integral to wax exit pipe 331 which, in the event of optional deployment of counter-rotating shaft 310, encases counter-rotating shaft 310, incorporating the end bearing of counter-rotating shaft 310 at the lower end of the thermal kiln reactor, such end bearing encased in a cage or similar device that allows passage of the wax past the end bearing, and blades 311 are eliminated from the second chamber 303 of thermal kiln 301 due to the presence of wax exit pipe 331. The wax captured in catch trough 330 flows with the force of gravity down-slope within wax exit pipe 331 in the annulus between shaft 310 and the interior wall of wax exit pipe 331, passing the suspended end bearing and subsequently exiting wax exit pipe 331 at wax discharge port 332. Given that wax exit pipe 331 passes through Zone 5 405 where temperatures exceed Zone 4 404 temperatures ranging from 300° C. to 338° C. (572° F. to 690° F.), limited pyrolysis of the wax within wax exit pipe 331 occurs. The magnitude of this pyrolysis and resulting loss of wax is mitigated by the short residence time of wax in that portion of wax exit pipe 331 within Zone 5 405. In the event that counter-rotating shaft 310 is not deployed, wax exit pipe 331 is completely open such that the wax captured in catch trough 330 flows with the force of gravity down-slope within wax exit pipe 331, unimpeded by the presence of counter-rotating shaft 310, subsequently exiting wax exit pipe 331 at wax discharge port 332. Depending upon the presence or absence of mineral-based additives, non-polymer contaminants and the like, the wax discharged from wax discharge port 332 may or may require filtering and/or other treatment if market specifications require.

In an alternative deployment of this preferred embodiment (not shown), thermal kiln reactor 301 is angled with a positive slope, i.e. inclined, with respect to the horizon 50, such that the entrance end of thermal kiln reactor 301 is at a lower elevation that the exit end, allowing the contents of the first chamber of thermal kiln reactor 301 to form a destabilizing melt pool at the low end of thermal kiln reactor 301. In this alternative deployment, catch trough 330 is also located immediately beneath an opening cut into the top of wax exit pipe 331 situated in the longitudinal center of thermal kiln reactor 301. Wax exit pipe 331 is not present along the entire length of thermal kiln reactor 301, but only along the length of the first chamber, coincident with Zone 4 404. In this alternative means of deployment, the operational level of the destabilizing melt pool coincides with the horizontal 50, the level of catch trough 330 and the level of central opening 305 to baffle dam 304, such that all 3 levels are equal. Accordingly, wax will exit the melt pool via catch trough 330 and wax exit pipe 331 at the low end of thermal kiln reactor 301 as well as through central opening 305 to baffle dam 304, thereby entering Zone 5 405. In this deployment, wax exit pipe 331 does not pass through Zone 5 405 where temperatures exceed Zone 4 404 temperatures ranging from 300° C. to 338° C. (572° F. to 690° F.), and no Zone 5 405 pyrolysis of the wax occurs within wax exit pipe 331. Although wax pyrolysis within exit pipe 331 is avoided in the inclined deployment, loss of wax loss occurs in an amount roughly equal to that of the declining deployment because some of the wax advances into the second chamber of the thermal kiln reactor coincident with Zone 5 405, is pyrolyzed, and converted to condensable and non-condensable product recovered from condenser array 80. Depending upon the presence or absence of mineral-based additives, non-polymer contaminants and the like, the wax discharged from wax discharge port 332 may or may require filtering and/or other treatment if market specifications require.

In yet another means of deployment and operation, the thermal kiln reactor 301 can be operated at a minimum temperature of about 349° C. to 338° C. (660° F. to 690° F.), more or less, and a maximum temperature of about 360° C. to 382° C. (680° F. to 720° F.), more or less in either the inclining or declining orientation. In this example, both chambers of the thermal kiln reactor operate within the same temperature range, roughly equivalent to that of Zone 4 404. Accordingly, in the absence of temperature Zones 5, 6, and 7, little, if any, pyrolysis of wax forming at the termination of Zone 4 404 will occur, and the vast majority of hydrocarbonaceous material, with exception of mineral impurities and the like, will be recovered as hard microcrystalline or paraffin wax. Depending upon the presence or absence of mineral-based additives, non-polymer contaminants and the like, the wax discharged from wax discharge port 332 may or may require filtering and/or other treatment if market specifications require.

Exhaust from gas burner array 306 and/or first heating zone 312 and second heating zone 313 is discharged from first exhaust port 321 exiting heating zone 312 and second exhaust port 322 exiting heating zone 313. The primary discharge from the thermal kiln reactor 301, namely hydrocarbon vapor resulting from pyrolysis of the hydrocarbonaceous material in thermal kiln reactor 301, is discharged via thermal kiln reactor exhaust port 323, to a downstream catalyst reactors and/or reflux reactors and/or fractionation columns (not shown), as may or may not be deployed and ultimately to condensation system 80.

The apparatus 10 is described in relation to the process Zones used throughout, each having a plurality of temperature and residence time. The apparatus 10 is comprised of a series of distinct, throughput process Zones through which the raw material blend is continually heated and advanced. Although modest temperature variation over operating periods is well tolerated by apparatus 10, for purposes of efficiency and to maintain the plurality between Zone temperature and residence time, it is desirable to maintain dynamic equilibrium in reactor 10. Dynamic equilibrium is achieved by maintaining a constant raw material throughput rate and constant reactor temperatures in each Zone once these temperatures have been achieved when operations ensue. The slower the raw material throughput, the longer the residence time. Although the dynamic equilibrium has been interrupted, less heat may be required to successfully drive the desired chemical reactions over a longer residence time so long as operations continue within rate-determining limits. In contrast, the faster the raw material throughput, the shorter the residence time. Although the dynamic equilibrium has been interrupted, more heat may be required to successfully drive the chemical reactions over a shorter residence time so long as operations continue within rate-determining limits. In both cases, if rate-determining limits are exceeded by variations in temperature and/or residence time, the desired reactions will not be experienced, and undesirable reactions may result. Accordingly, if the dynamic equilibrium is not maintained, operations in disequilibrium pose risk to efficient system operation and consistency in product quality.

Although it is critical to maintain the plurality between Zone temperature and residence time, limits exist as to functional ability to maintain this plurality if the dynamic equilibrium is interrupted. These limits stem from, among other things, reactor design capacity, fixed thermal conductivity of the hydrocarbonaceous material and reaction kinetics. For example, an excessive feed rate beyond that contemplated in reactor design is likely to result in residence times being insufficient to facilitate heat transfer to the hydrocarbonaceous material. Those reduced residence times may be insufficient for the desired reactions to achieve the desired level of completion even if adequate heat could be transferred to the hydrocarbonaceous raw material. In another example, in an attempt to compensate for faster raw material throughput, one might increase the temperature of the heating system. Although limited benefit is achieved by this action, the temperature differential between heated surfaces and the hydrocarbonaceous material can become so extreme as to prematurely promote reactions which ideally should occur in a successive Zone, thereby losing Zone definition in apparatus 10. Risks created by overheating to compensate for excessive throughput include creation of excessive reactor pressure/unsafe operation conditions, as well as overproduction of gas and char at the expense of solid wax and/or condensable hydrocarbon yield. In another example, a feed rate far below apparatus 10 capacity or chronic interruptions to feed can result in excessive residence times.

The apparatus 10 is comprised of a series of distinct, throughput process Zones through which the raw material blend is continually heated and advanced. There are seven of these throughput process Zones: the Raw Material Feed Zone 401, the Compression Zone 402, the Melt Zone 403, the Mixing, Molecular Destabilization and Heteroatom Scavenging Zone 404, the Pyrolysis Zone 405, the Devolatilization Zone 406, and the Char Discharge Zone 407.

Zone 1: Raw Material Feed Zone.

Zone 1 401 is operated at ambient temperature and pressure for a residence time of less than one minute. In the embodiment of the present invention shown in FIG. 1, raw materials are introduced to the apparatus at the entrance 100. The exact means of introducing feed materials is not critical, and may be of any method known in the industry so long as the feed method selected is sufficiently robust and effective thereby avoiding failure to feed shredded and often highly compressible raw materials, and isolate undesirably large and bulky non-polymeric solid contaminants that will foul the reactor feed entrance 100 or the reactor 10 itself. The purpose of this Zone is to accept material into the apparatus 10 and move the material into the next Zone.

The present apparatus 10 allows for the purposeful combination of mixed and/or varying solids with any quantity, including zero, of mixed and/or varying petroleum-based liquids. It provides for efficient conversion of widely variable raw material streams, highly contaminated raw material streams, and raw material streams having inconsistent compositions over time. Additionally, hydrocarbonaceous materials can be fed at entrance 100 to apparatus 10 with finely divided, mineral-based additives selected from one or more melt-phase heteroatom scavengers in forms including but not limited to oxides, hydroxides and/or carbides of the group consisting of alkali metals, alkaline earth metals, transition metals, post-transition metals and/or metalloids. Optionally, for example, when only light oil, diesel additive or gasoline additive is desired, feed materials can additionally include addition of one or more melt-phase catalysts in forms including but not limited to oxides, hydroxides and/or carbides of the group consisting of alkali metals, alkaline earth metals, transition metals, post-transition metals, metalloids, non-metals and/or naturally-occurring & synthetic silicate minerals.

Addition of mineral-based additives and/or melt-phase catalysts at entrance 100 is optional, depending upon factors including but not limited to composition of the raw hydrocarbonaceous materials, desired product mix, e.g. ratio of produced oil to produced gas, ratio of produced wax to oil and desired molecular composition of condensable hydrocarbon products. For example, when addition of heteroatom scavengers is desired, the weight percentage of heteroatom scavenger of the total hydrocarbonaceous material added to the reactor, such percentage ranging from 0% to 20% or more, is determined by weight of the scavenger in the reactor. Thorough dispersion of mineral-based additives and/or melt-phase catalysts is critical to efficient use of these mineral-based additives and/or melt-phase catalysts and to prevent reactor fouling, especially in Zones 1 through 4 resulting from the presence of excessive finely divided mineral-based additives and/or melt-phase catalysts. Some but not all of the heteroatom scavenger will be available to participate in the desired reactions if dispersion of the scavenger in the hydrocarbonaceous material is not be complete. Moreover, some of the heteroatom scavenger may aggregate in the hydrocarbonaceous material prior to or after introduction of the hydrocarbonaceous material to the reactor, thereby reducing its availability to participate in the desired reactions. If only one primary reaction involving heteroatom scavenger is anticipated, the optimal weight percentage of heteroatom scavenger added to the total hydrocarbonaceous raw material feed may be the sum of the amount of heteroatom scavenger stoichiometrically required to complete all desired dehalogenation and desulfurization reactions plus the amount of heteroatom scavenger not available to the desired reactions due to, for example, incomplete dispersion of heteroatom scavenger in the system. If more than one primary reaction involving heteroatom scavenger is anticipated, such scavenger can be consumed by competing reactions. As one of many possible examples, if the hydrocarbonaceous material includes polyvinyl chloride (PVC) and/or polyvinylidene chloride (PVDC) in the presence of polyesters of terephthalic acid (PET), competing reactions may include conversion of hydrochloric acid evolving from PVC and PVDC to calcium chloride salt and water, as well as promoting conversion of the sublimates terephthalic acid and benzoic acid evolving from the decomposition of PET to benzene. Accordingly, the amount of heteroatom scavenger added to the hydrocarbonaceous material must be sufficient to allow for all desired competing reactions to achieve completion. Similarly, the number of polymer species and their relative concentrations in the raw hydrocarbonaceous material will impact polymer decomposition rates. For example, citing simple first order kinetics, rate limited on a single species, the addition of more of that species can promote acceleration of the decomposition rate. Determination of optimum weight percentages, if any, of heteroatom scavengers to the raw hydrocarbonaceous material must be made with thorough knowledge of the composition of the hydrocabonaceous material, as well as any anticipated variance of that same material over time. Similarly, polymer decomposition rates can change via catalyst addition to the hydrocarbonaceous material whereby energy barriers are lowered, resulting in interactions to accelerate some, but not all, decomposition reactions. Selection and quantity of catalyst, if any, added to the hydrocarbonaceous material are functions of the composition of the hydrocarbonaceous material.

Zone 2: Raw Afaterial Volume Reduction 1 Compression Zone.

Zone 2 402 is operated to reduce the volume of the hydrocarbonaceous material, expel atmospheric air from the hydrocarbonaceous material at a temperature below the flash point of the hydrocarbonaceous material, and to generate and expel steam as moisture in the hydrocarbonaceous material boils. Zone 2 402 is operated with an internal temperature, as opposed to skin temperature, not less than ambient temperature and not more than 220° F., more or less. In Zone 2, the hydrocarbonaceous material experiences increase in pressure resulting from temperature increase, shear force and evolution of steam. At the beginning of Zone 2, pressure is at or near ambient pressure. As heat builds, the hydrocarbonaceous material undergoes shear. As steam evolves, Zone 2 pressure increases to a maximum of as little as 50 psig, more or less, or as much as 500 psig, more or less, depending upon the amount of moisture in the hydrocarbonaceous material as introduced into Zone 2 as well as the clearance between the extruder screw and barrel, a control upon the degree of shear. At the end of Zone 2, if steam is discharged from steam port 204, the pressure in Zone 2 will fall to a minimum of not less than 2 psig at steam port 204. Residence time in Zone 2 is not less than 15 seconds, more or less, and not more than 5 minutes, more or less, depending upon extruder screw and barrel design. The volume of the hydrocarbonaceous material is reduced, and feed materials are compressed by the rotating screw within screw and barrel assembly 210, forcing air and moisture, as steam, out of the system under optional vacuum. Raw material moisture reduction is accomplished thereby to a moisture content ranging from less than 1% moisture by weight up to 15% moisture by weight, more or less. In the preferred embodiment, moisture is reduced to about 10% by weight. Expelled air and moisture can be routed to an activated carbon bed. Condensed water can be disposed of as waste water. Operation of the activated carbon bed may, depending upon governmental agency jurisdiction, require environmental permitting of a waste water pre-treatment system. The remaining air can, for example to promote odor control, optionally be directed to the air intake of a direct-fired reactor heating system or the air intake of a generator set ("genset", not shown) comprising a diesel generator fueled by the non-condensable gas product discharged from gas discharge port 830 (shown in FIG. 4) plus a dynamo. A genset can be used to generate electricity, which can be used utilized by the apparatus and/or distributed to other parts of the facility.

Zone 3: Raw Afaterial Melt Zone.

Zone 3 403 is operated with an internal reactor temperature range between 220° F. and 572° F., more or less, for a residence time of not less than 10 minutes and not more than 45 minutes, more or less. In Zone 3, the hydrocarbonaceous material experiences increase in pressure resulting from temperature increase, shear force and expansion of the hydrocarbonaceous material upon melting. At the beginning of Zone 3, pressure is not less than 2 psig at a point coincident with steam port 204. As heat builds, the hydrocarbonaceous material undergoes shear. As melting occurs and the hydrocarbonaceous material expands, Zone 3 pressure increases to a maximum of as little as 50 psig, more or less, or as much as 800 psig, more or less, depending upon the composition of the hydrocarbonaceous material as well as the clearance between the extruder screw and barrel, a control upon the degree of shear. For example, if the hydrocarbonaceous material is composed of polyisobutylene, some or all of the polyisobutylene will enter Zone 3 as a melt, depending upon the isomers of polyisobutylene constituting the material. In another example, if the hydrocarbonaceous material is composed of low density polyethylene, the minimum Zone 3 operating temperature is 220° F. or more, in an operating temperature adequate to accomplish melting of all constituents have a melting point at or below 220° F., more or less. In yet another example, if the hydrocarbonaceous material is composed of polystyrene, the minimum Zone 3 operating temperature is 464° F. or more, in an operating temperature adequate to accomplish melting of all constituents have a melting point at or below 464° F., more or less. If organic halogens are present in the melt, operation of the present invention will result in generation of a relatively modest yield of halogen acids in the temperature range of not less than 305° F. Additional hydrochloric acid may evolve in Zone 3 403 as the Zone 3 operating temperature approaches 572° F. In that event, salts resulting from the reaction of heteroatom scavenger and halogen acids will begin to form, acting with remaining halogen acids as melt-phase cracking catalysts generated in situ by operation of the present invention. If halogen acids begin to form at the end of Zone 3, operation of Zone 3 in the upper portion of the Zone 3 operating pressure range is experienced.

Zone 4: Mixing, Destabilization and Heteroatom Scavenging Zone.

Zone 4 404 is operated with an internal reactor temperature range of not less than 572° F. and not more than 690° F., more or less, for a residence time of not less than 30 minutes and not more than 120 minutes, more or less. In Zone 4, the hydrocarbonaceous material experiences increase in pressure resulting from temperature increase, shear force, evolution of halogen acids resulting from the decomposition of PVC, PVDC, certain fire retardants and the like, and evolution of hydrocarbon vapors resulting from the decomposition of certain additives and plasticizers. At the beginning of Zone 4, pressure is equivalent to that at the contiguous termination of Zone 3, in the range of 50 psig, more or less, to as much as 800 psig, more or less. As heat builds, the hydrocarbonaceous material expands as it undergoes further shear. As hydrocarbon vapors and halogen acids evolve, Zone 4 pressure increases to a maximum of as much as 1,200 psig, more or less, depending upon the quantity of hydrocarbon vapors and halogen acids that evolve as well as the clearance between the extruder screw and barrel, a control upon the degree of shear. Near the termination of the extruder screw and barrel assembly 210, a position at or near the center of Zone 4, hydrocarbon vapors and halogen acids are discharged from halogen exit port 205, optionally under slight vacuum. At this point, the pressure in Zone 4 will fall to a minimum of not less than 2 psig at halogen exit port 205 or possibly lower if optional vacuum is deployed. Destabilizing hydrocarbonaceous material is discharged from extruder 201 via connecting port 207 to thermal kiln reactor 30L Nominal to modest pressure increase is experienced within the piping run of connecting port 207, a continuation of Zone 4, as the hydrocarbonaceous material continues to destabilize. Upon discharge to the continuation of Zone 4 within the first chamber 302 of thermal kiln reactor 301, pressure decrease is experienced to the operating pressure of the thermal kiln reactor, generally not more than 5.0 psig, more or less.

The purpose of this section of the apparatus operated in Zone 4 is to thoroughly mix the melt for a prolonged period, destabilize molecules comprising the melt, scavenge sulfur (desulfurize), and convert organic halogens to solid salts (i.e. dehalogenate).

Polymer cracking within the hydrocarbonaceous materials is promoted by multiple-stage generation of hydrochloric acid, hydrobromic acid and/or hydrofluoric acid. Such acids are commonly identified as cracking catalysts. Concurrently and subsequently, reaction of these halogen acids with heteroatom scavenger results in conversion of organic halogens in the hydrocarbonaceous material to salts which are also identified as cracking catalysts. Accordingly, in addition to Zone 4 404 generation of hydrocarbon vapors as a result of decomposition of certain polymer plasticizers and additives in Zone 4, operation of Zone 4 also results in production of hydrocarbon vapors at temperatures well below those predicted by standard thermal and kinetic models. Upon condensation, such hydrocarbon vapors produced in Zone 4 404 result in not less than 2% nor more than 22%, more or less, of the total condensable product yield of the present invention. The efficacy of heteroatom scavenging and rate of production of product oil resulting from operation of Zone 4 404 are controlled by factors including but not limited to ramp rate to achieve Zone 4 operating temperature, residence time in. Zone 4, and interplay of the geometry of Zone 4 vs. raw material throughput rate and composition. Zone 4 geometry is a function of factors including the length and diameter of that portion of extruder screw and barrel assembly 210 within Zone 4, extruder screw design, the length of heated connecting port 207, the length and diameter of the first chamber 302 of thermal kiln reactor 303 within Zone 4, desired collective residence time in all portions of Zone 4 and, to a far lesser degree, total mass loss from Zone 4 melt. Heteroatoms removed from the hydrocarbonaceous melt via reactions in Zone 4 accumulate largely as salts in the char material, which is removed from subsequent Zone 7, described below.

In addition to the products of pyrolysis recovered from subsequent segments of the present invention, microcrystalline and/or paraffin wax product can be directly discharged from a point at the transition from Zone 4 404 to Zone 5 405, specifically, at the termination of the first chamber 302 of thermal kiln reactor 301 via wax recovery at catch trough 330, subsequent wax flow through wax exit pipe 331 and ultimate recovery at takeoff port 332. While sheared and subsequently mixed melt within the first portion of Zone 4 maintains characteristics of melted plastic when discharged and examined upon freezing, as the material progressively destabilizes as it advances within the last half of Zone 4 toward the transition of Zone 4 404 to Zone 5 405, the material begins to experience cracking that is dominated by homologous cracking, gradually losing viscosity and, upon freezing, becoming more friable, eventually taking on the characteristics of hard wax when the melt is held at adequate residence time in the temperature range of 352° C. (670° F.) to 365° C. (690° F.). Given that relatively little char has formed prior to pyrolysis in Zone 5, wax discharged from takeoff port 332 is contaminated only by dissolved lower molecular weight hydrocarbon molecules which have not evolved from the wax as vapor, non-hydrocarbonaceous components of the raw material introduced into the reactor, and reaction byproducts, if any, of heteroatom scavengers, if any were introduced. The reactor can be operated with or without wax take-off. If the wax is not removed, it remains in the reactor in a liquid state and is further processed in subsequent Zones. If this hard wax is removed and recovered, it will cool to a solid state at room temperature. As such, wax is to be considered a solid product.

Certain non-polymeric materials in the hydrocarbonaceous material will participate in and/or promote reactions resulting in changes in end-product molecular composition.

Figure 4:
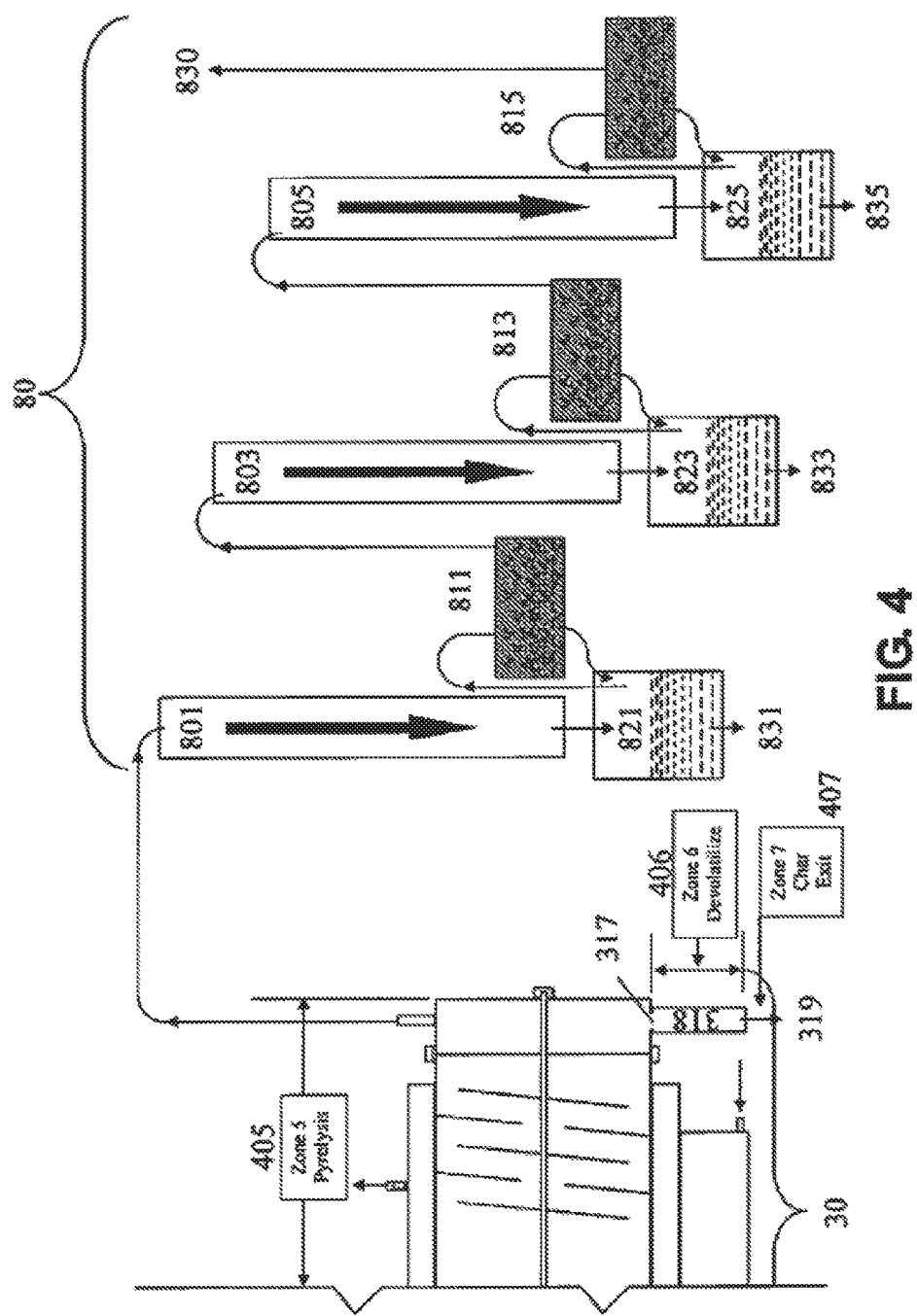
FIG. 4 is a schematic side view of a step-down condenser array and its deployment downstream of a dual stage, zone-delineated pyrolysis apparatus in accordance with the present invention.

For example, the presence of paper as a contaminant of the raw hydrocarbonaceous material introduced into apparatus 10 may cause a proportional increase in concentration of aromatic and polynuclear aromatic hydrocarbons at the expense of paraffin and/or isoparaffin in the wax which can be recovered from takeoff port 332 shown on FIG. 3 as well as in the condensable hydrocarbon vapors condensed and recovered from takeoff ports 831 and/or 833 and/or 835 shown on FIG. 4. If the primary products desired include an aromatic cut, the presence of paper in the raw material can offer an advantage. In another example, laminate food-packing wastes including aluminum foils as components of the laminate can be present in municipal waste plastics. After the polymer layers melt, the aluminum foil is released. The metallic surface of the aluminum promotes rapid depolymerization on its surface, resulting in increased yield of the wax fraction.

Wax discharge from takeoff port 332 results in a higher total process yield of condensable petroleum hydrocarbons than operation of the present invention with no wax discharge from takeoff port 332. When condensable hydrocarbons are removed as wax from takeoff port 332, those removed molecules do not experience pyrolysis in Zones 5 405, and 6 406, and the proportional yield of gas and char is lower. In general, the relatively limited amount of char suspended in wax discharged from takeoff port 332 is composed largely of carbon resulting from the decomposition of cellulose included as a contaminant to the raw material feed, non-polymeric matter included as a contaminant to the raw material feed, reacted and un-reacted heteroatom scavenger, if heteroatom scavenger is added, melt-phase catalyst created in situ, and any melt-phase catalyst added to the raw material feed.

Wax resulting from decomposition of mixed polymers and recovered from takeoff port 332 exhibits many characteristics of microcrystalline wax in contrast to paraffin wax, including ratio of unbranched to branched alkanes, darker color, higher melting point, hardness and adhesive characteristics.

Zone 5: Pyrolysis Zone.

Zone 5 405 is operated with an internal reactor temperature range appropriate to the blend of raw material introduced into the primary thermal reactor, commonly between 365° C. (690° F.) and 393° C. (740° F.), more or less, at the lower end of the temperature range, and 454° C.-488° C. (850° F.-910° F.), more or less, at the upper end of the temperature range, and at in situ derived reactor pressure, generally not more than 5.0 psig, more or less, for a residence time of not less than 30 minutes and not more than 90 minutes, more or less. The lack of oxygen, coupled with high temperature over the required residence time, results in various pyrolysis reactions taking place governed by high-order reaction kinetics, breaking down the polymeric material into volatile vapors and char material. The vapor stream is composed primarily of vapor, but may contain aerosol liquids and condensable molecules. This vapor stream is subject to further down-stream treatment (described below), wherein condensable and non-condensable vapors are separated. The condensable vapors form liquids including oil, light sweet crude oil, fuel additives, and base oil. A heavier fraction can form solid products, generally in the form of slack wax. The non-condensable vapors or gases are recovered and can be optionally passed to a genset (described above) to produce electric power or can be circulated prior to use elsewhere as the vapor blanket over liquid product (discussed in more detail below).

The ultimate yields of condensable hydrocarbons, as well as relative material balance of oil, gas, char and inorganic residue, are controlled by several factors. These factors include, but are not limited to, operating temperature, interplay of the geometry of Zone 5 405 versus raw material throughput rate, residence time required for pyrolysis reactions to go to completion, desired magnitude of reaction completions, raw material composition, and recovery, if any, of wax product from takeoff port 332. Zone 5 geometry is a function of factors including but not limited to length of the second chamber of the thermal kiln reactor, thermal kiln reactor diameter, internal design of the thermal kiln reactor, and forecasted rate of mass loss via vapor evolution and emission from Zone 5 melt. This rate of mass loss is a key input from an interactive thermal and kinetic model into design of Zone 5 geometry. The process comprising the present invention is characterized by the virtual absence of oxygen and organic halogens in Pyrolysis Zone 5 405 coupled with the presence of in situ derived catalysts, including salts.

Operation of Zone 5 405 results in significant loss of mass of the hydrocarbonaceous material as pyrolysis proceeds on the continuously advancing hydrocarbonaceous material and vapor is expelled from the reactor. Thermal kiln reactor 301 operates as a boiler in which the pyrolyzing hydrocarbonaceous material exhibits a boiling and dynamic transitional interface of vapor above incompletely pyrolyzed hydrocarbonaceous material. This transitional surface continually evolves as it boils under conditions of the dynamic equilibrium until the hydrocarbonaceous material is effectively pyrolyzed, leaving only the solid char material and any incompletely pyrolyzed hydrocarbonaceous material to be advanced into Zone 6 406 for devolatilization and coking. Accompanying and correlative change in viscosity of the hydrocarbonaceous material is experienced in the reactor as pyrolysis proceeds to completion.

Optionally, for example, in cases where accelerated evacuation of product vapor from Zone 5 is desired, and depending upon the product mix desired, a non-condensable carrier gas can be introduced into thermal kiln reactor 301 at auxiliary injection port 320. Optional addition of carrier gas results in a proportional increase in vapor flow exiting the second chamber 303 and corresponding Zone 5. Accordingly, condensers 80 must be designed to accommodate the increased rate of vapor flow if this option is to be exercised. Such non-condensable carrier gas is comprised of nitrogen and/or a recycled non-condensable gas fraction resulting from operation of the present invention and/or methane from natural gas or any blend of these non-condensable gases. Use of a recycled gas and/or methane as an alternative to nitrogen for carrier gas has a benefit of increased BTU content of produced process gas in the absence of dilution by nitrogen, as well as decreased operating expenses by eliminating the need to purchase or generate nitrogen. This aspect of the present invention can, depending upon raw material composition and range of operating conditions, also result in the unanticipated benefit of increase in oil yield, unanticipated albeit modest benefit of slight increase in hydrogen concentration of the reactor atmosphere in the pyrolysis environment, and an unanticipated increase in the hydrogen concentration of resulting process gas.

Zone 6: Char and Residual Solids Devolatilization Zone.

Zone 6 406 serves to drive volatile hydrocarbons from the char as well as to convert any remaining oligomer and semi-volatile aromatic hydrocarbons to coke. Zone 6 is operated with an internal reactor temperature not less than the maximum pyrolysis temperature appropriate to the blend of raw material introduced into the thermal reactor, commonly between 454° C. (850° F.) and 488° C. (910° F.), more or less, and not greater than 982° C. (1800° F.), more or less, commonly and preferably between 593° C. (1100° F.) and 649° C. (1200° F.), more or less, and at in situ derived reactor pressure, generally not more than 5.0 psig, more or less. Zone 6 406 is operated at an in situ derived reactor pressure, generally not more than 0.8 psig, more or less, and a residence time of not less than 15 minutes and not more than 60 minutes, more or less. Vapor resulting from reactions occurring in Zones 5 405 and 6 406 is discharged to outlet 323 positioned in Zone 5 405. The outlets can be a single outlet 323, or a plurality of outlets, including back-up or auxiliary outlets.

A scrubber (not shown) can be used to recover any residual halogens not captured in Zone 4 404 prior to discharge to step-down condensers 80. This heteroatom scrubber is operated in a temperature range appropriate to recovery of halogens in each unique raw material blend, but not at an excessive temperature to promote cracking, for example between 338° C. (640° F.) and 365° C. (690° F.), more or less.

Vapor resulting from operation of Zone 6 406 can be optionally routed to catalyst reactors and/or reflux reactors and/or fractionation columns (collectively, not shown) for further processing prior to discharge to step-down condensers 80. Vapor emanating from Zones 5 405, 6 406 and/or 7 407 of thermal kiln reactor 301 and/or the scrubber can be routed to one or more secondary catalyst reactors and/or reflux reactors and/or fractionation columns (collectively, not shown). These reactors and/or columns are designed to optimize molecular size and molecular species distribution in the condensable product as may be desired.

In addition, the purpose of Zone 6 406 includes completion of molecular cracking to the desired end point, also targeting decomposition of some but not all silanes and siloxanes. Notably, of the hydrocarbonaceous material including polyfluoroethylene (PTFE), chloromethylaromatic silanes (a component of flexible, multi-layer circuit boards) or other halogenated species for which kinetic models describe dehalogenation at temperatures exceeding 454° C. (850° F.), capture of said halogens must be accomplished at a scrubber (not shown) located downstream from thermal kiln reactor 301 and upstream of the condenser array 80.

Optionally, if olefin content of the condensable products is problematic, an anti-oxidant/stabilizer/inhibitor (hereinafter referred to as "inhibitor") can be injected downstream from discharge from thermal kiln reactor 301 and downstream from a point of vapor discharge from any catalyst reactors and/or reflux reactors and/or fractionation columns where temperature mitigation is sufficient. The inhibitor may be comprised of 4-tert-butylcatechol, other alkyl catechols, 2,6-dinitro-p-cresol (DNPC), cuts of whole or topped asphaltic crude oil, phenylenediamine and/or commercially available materials in the category of oxy-compound inhibitors. The inhibitors are introduced to inhibit broad spectrum, downstream oxidative reactions involving metastable molecular species as well as additive polymerization which would otherwise occur. The refluxed product stream at a temperature of about 280° F. can be injected with inhibitor at a rate of about 0.00001 to 0.05 mole percent to condenser 801 if condenser 801 is operated at a maximum temperature below about 280° F. or injected to condenser 803 if condenser 801 is operated at a maximum temperature above about 280° F.

Product vapor is discharged from discharge port 323 or, if deployed, downstream catalyst reactors and/or reflux reactors and/or fractionation columns and/or scrubbers to step-down condensers 80 in series, for example to condensers 801, 803 and 805 shown on FIG. 4, optionally supplemented by demisters 811, 813 and 815 between condensers for those required applications where more efficient separation than condensers alone can achieve. A final demister system (not shown) can be deployed at the termination of the condensation train when it is necessary to very efficiently remove residual aromatic hydrocarbons from the non-condensable gas product. Each condenser in the series is operated within a predetermined temperature range specified to isolate molecules within desired dew point ranges, resulting in condensable products having respective API gravities and pour points and/or melting points. In the embodiment illustrated in FIG. 4, the first condenser 801 in the series 80 operates at the highest temperature range, and the final condenser 805 in the series operates at the coldest temperature range. Optional multiple demisters 811, 813 and 815 are operated at temperatures corresponding to the minimum operating temperatures of their respective condensers. The condensers and, where deployed, the demisters are fitted with collection vessels 821, 823 and 825, also known as knockouts, which provide for oil accumulation/takeoff, and oil-water separation as may be required for each petroleum cut that is to be recovered.

Condensable product cuts are recovered from each condenser and its dedicated demister to respective knockouts 821, 823 and 825 that provide for density separation of in situ derived water and oil. Multiple condensers deployed in series 80 constitute a series of step-down condensers, also known as a condenser train. As an example, if the step-down condenser train is constructed in a fashion adequate to recover at least 4 cuts, four step-down condensers are installed in series. Slack wax can be recovered from the first step-down condenser and its respective demister if operated between 300° F. and 360° F., more or less, or, alternatively, slack wax and base oil can be recovered from the first step-down condenser and its respective demister is operated between 130° F. and 300° F., more or less. Light sweet crude oil, sometimes described as diesel additive, can be recovered from the second step-down condenser and its respective demister if operated between 90° F. and 130° F., more or less. The majority of water can be recovered coincident with recovery of $C_4$-$C_8$ hydrocarbons, sometimes described as condensate or gasoline additive, from the third step-down condenser and its respective demister if operated between 60° F. and 90° F., more or less. A light aromatic cut, as well as the principal balance of water, is recovered from the fourth and final step-down condenser and its respective demister if operated between 35° F. and 60° F. more or less.

Liquid product can be routed to remote day tanks through takeoff ports 831, 833 and 835 as depicted in FIG. 4 and subsequent product sale. Product tanks containing liquids having higher pour points or wax products that must be transported in the molten state are heated to a point minimally above respective product pour points and/or melting points to provide for product transfer without distilling the products in their respective day tanks. The preferred embodiment is to maintain an anaerobic, non-condensable vapor blanket over liquid products to minimize product degradation via oxidation and retard the formation of tar and varnish resulting from additive polymerization that may occur, attributed to the presence of olefins, especially if inhibitor (as described above) is not added to the product. The vapor blanket can be comprised of non-condensable product gas produced by the apparatus and discharged from gas discharge port 830. Tank vapor inlets and vents can be pressure regulated and can be integral to the non-condensable gas discharge port 830 of the present invention. Heavy cuts recovered from the first condenser 801 can be recycled back into the process as described above if recovery and sale of heavy cuts is not desired.

Residual, non-condensable gas is recovered from non-condensable gas discharge port 830 and can be optionally passed to a genset (described above) to produce electric power. Alternatively, the recovered non-condensable gas can be circulated prior to use elsewhere as the vapor blanket over liquid product in the liquid product tanks, consumed as fuel for direct-fired heating of the reactor apparatus, consumed as fuel for other purposes, or flared.

An optional genset, deployed when electric power generation is advantageous such as in remote locations or if the price of electricity is prohibitive, can take in make-up air from the compression zone 402 and/or areas where odor control is desired, e.g. post-consumer plastic raw material inventory storage, product driers and the like. Exhaust from the genset is routed to an air pollution control system.

In situ derived water, recovered from moisture entering the primary thermal reactor with the raw hydrocarbonaceous material and created by chemical reactions in the primary thermal reactor and elsewhere, can be separately recovered from the bottom of the knockouts 821, 823 and 825 as depicted in FIG. 4, passed over a carbon bed to adsorb dissolved aromatic hydrocarbon compounds, and subsequently vaporized to steam using waste heat from the genset, if deployed, from direct-fired heating of the reactor, and/or from elsewhere. Optionally, some portion of this steam can be passed over activated carbon and the condensate disposed of as waste water, or returned to the process at auxiliary injection port 320 promote the water-gas shift reaction. Alternatively, it can be routed to the air pollution control system as steam.

Zone 7: Char and Solids Discharge Zone.

This zone 407 is operated with an internal reactor temperature range of not less than the maximum temperature of the preceding Zone 6 406 and not greater than 1,800° F., more or less, at the start of the discharge zone to ambient temperature at the conclusion of discharge. It is operated at in situ derived reactor pressure, generally less than the system pressure experienced in Zone 6 406 and not more than 1.0 prig, more or less, experienced in Zone 7 and beneath and/or downstream from vapor takeoff port 323 which operates at relative vacuum due to its respective discharge to condensers 80. The residence time in the char discharge zone is not less than 15 minutes and not more than 30 minutes. Solid char is removed from the system, and inert contaminants including but not limited to glass, stones, metal and the like are sequestered from the reactor thereby with the char. Solids from Zone 7 407 are discharged via char exit 319. Solids can be discharged to a sealed, cooled continuous process solids takeoff system (not shown) which can be a part of Zone 7 407. At its hot end, the char is purged with methane from natural gas to mitigate residual adsorbed aromatic and polynuclear aromatic hydrocarbons. The system is designed to collect and/or separate and cool the solids, prevent re-adsorption of aromatic hydrocarbons and polynuclear aromatic hydrocarbons onto the char via ethane purge, and convert vapor entrained in the solids stream from a hot, anaerobic atmosphere dominated by methane purge gas in Zone 7 407 downstream from char exit 319 to atmospheric air at a temperature below the flash point of the solids at the termination of Zone 7 407. This is done in such a manner so as to prevent spontaneous combustion and mitigate a dust explosion hazard. Given the very high insulating capacity of char, adequate residence time to allow cooling is critical to avoid spontaneous combustion.

The ability of the present invention to prevent the re-adsorption of aromatic hydrocarbons and polynuclear aromatic hydrocarbons onto the char in Zone 7 407 is an important improvement over prior char recovery attempts. Pyrolysis char is notoriously known as being "sticky" given the presence of adsorbed tar composed of aromatic and polynuclear aromatic hydrocarbons. This problem is solved by the ability of the present invention to prevent re-adsorption of aromatic hydrocarbons and polynuclear aromatic hydrocarbons onto the char by hot methane purge prior to final cooling as it is discharged. As a result, given the absence of nearly all aromatic and polynuclear aromatic hydrocarbons, if the char must be disposed of as a waste, char discharged from Zone 7 407 of the present invention does not exhibit the D018, D023, D024, D025, D026 or D036 toxicity characteristics of hazardous waste as described in 40 CFR Part 261.20. Given the great difference in disposal cost between non-hazardous solid waste and hazardous waste, this improvement of the present invention provides a means to dispose, if necessary, char as non-hazardous solid waste in contrast to hazardous waste as identified by the hazardous waste codes previously identified.

Fouling is a common problem and can occur at various points in the apparatus. Such points include discharge nozzles exiting the primary thermal reactor. This fouling is a result of deposition of char, varnish, tar, terephthalic acid, benzoic acid, mineral salts and the like. These deposits can be removed and/or prevented from accumulating in various ways. One method is by operation of one or more mechanical rapper systems which are installed in the interior of the nozzles or other ports. One preferred embodiment of a rapper system is described in U.S. patent application Ser. No. 13/735,677, "Anti-Fouling Apparatus for Cleaning Deposits in Pipes and Pipe Joints" filed Jan. 7, 2013. That rapper apparatus is designed to abrade the interior of surfaces prone to fouling while allowing bypass of vapor so as not to create unwanted pressure drops and pressure fluctuations, and are operated via scheduled manual use or via electronic control. The resulting vapor is passed through a filter element comprised of ceramic, glass fibers, and/or an electrostatic device to mitigate passage of suspended particles to successive segments of the system. This reduces downstream system fouling, undesirable downstream chemical reactions, including catalysis, promoted by the presence of particles of char and/or salts and oxides and entrained/suspended particulate matter otherwise contributing to total metals concentration in the condensable products.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What is claimed is:

1. An apparatus for continuous conversion of hydrocarbonaceous materials to condensable, non-condensable and solid hydrocarbon products, comprising:

at least one extruder capable of providing shear force and heat and having three or more treatment zones, a continuous process thermal kiln reactor, said extruder and said kiln reactor being in fluid communication, wherein said at least one extruder has at least three zones, including a zone for compressing and dewatering said hydrocarbonaceous materials, a zone for melting said hydrocarbonaceous materials to convert said hydrocarbonaceous materials from a solid to a liquid, and a zone for mixing, destabilizing and dehalogenating said hydrocarbonaceous materials, whereby said hydrocarbonaceous material is subjected to a plurality of defined temperature ranges and residence times, wherein said kiln reactor comprises at least two zones, including a zone for further destabilizing and dehalogenating, and a zone for pyrolyzing and for devolatilizing the pyrolyzed hydrocarbonaceous materials, whereby said hydrocarbonaceous materials are converted to vapor products, wherein said vapor products can be further treated to produce condensable and non-condensable products, and solid hydrocarbon products, wherein said hydrocarbonaceous materials are maintained within the zones for a range of defined temperature and residence times, wherein said apparatus collectively provides thermal and kinetic environment required to convert hydrocarbonaceous materials, and wherein the zone for further destabilizing and dehalogenating and the zone for pyrolyzing and for devolatilizing the pyrolyzed hydrocarbonaceous materials are divided by a baffle dam.

2. The apparatus of claim 1 wherein said extruder comprises a plurality of screw and barrel configurations which define a zone for feeding, the zone for compressing and dewatering to remove air and moisture from said hydrocarbonaceous materials, the zone for melting said hydrocarbonaceous materials to convert said hydrocarbonaceous materials from a solid to a liquid, and the zone for mixing, destabilizing and dehalogenating said hydrocarbonaceous materials.

3. The apparatus of claim 1 wherein all or part of said apparatus is inclined with respect to the horizon at an angle between about −20° to about +20°.

4. The apparatus of claim 3 wherein all or part of said apparatus is inclined with respect to the horizon at an angle between about +2° to about +6°.

5. The apparatus of claim 3 wherein all or part of said apparatus is inclined with respect to the horizon at an angle between about −2° to about −6°.

6. The apparatus of claim 1 further including a series of step-down condensers for condensing said vapor products to recover liquid products.

7. The apparatus of claim 1 further including direct recovery of wax from a point located at the transition from the mixing, molecular destabilization and heteroatom scavenging zone to the pyrolysis zone.

8. The apparatus of claim 1, wherein a steam port releases steam from the zone for compressing and dewatering said hydrocarbonaceous materials before the hydrocarbonaceous materials enter the zone for melting said hydrocarbonaceous materials.

9. The apparatus of claim 8, wherein a halogen exit port releases halogen acids from the zone for mixing, destabilizing and dehalogenating said hydrocarbonaceous materials.

10. The apparatus of claim 1, further comprising a second kiln reactor having at least two zones, including a zone for further destabilizing and dehalogenating, and a zone for pyrolyzing and for devolatilizing the pyrolyzed hydrocarbonaceous materials, whereby said hydrocarbonaceous materials are converted to vapor products, wherein said vapor products can be further treated to produce condensable and non-condensable products, and solid hydrocarbon products.

11. The apparatus of claim 1, wherein said zone for compressing and dewatering said hydrocarbonaceous materials compresses and dewaters said hydrocarbonaceous materials within the extruder by a combination of temperature increase, shear force, and evolution of steam.

12. The apparatus of claim 1, wherein the baffle dam comprises a cylindrical disc or plate.

13. An apparatus for continuous conversion of hydrocarbonaceous materials to hydrocarbon products, comprising:
an extruder having at least three zones including a compressing zone, a melting zone and a mixing, destabilizing and dehalogenating zone;
a rotatable reactor in fluid communication with the extruder and having at least three zones including a destabilizing and dehalogenating zone, a pyrolyzing zone and a devolatilizing zone,
wherein each zone of the extruder and the rotatable reactor retains the hydrocarbonaceous material for a predetermined residence time and a predetermined temperature range to provide thermal and kinetic conversion of the hydrocarbonaceous materials, and
wherein the dehalogenating zone and the pyrolyzing zone are divided by a baffle dam.

14. The apparatus of claim 13, wherein a steam port releases steam from the compressing zone before the hydrocarbonaceous materials enter the melting zone.

15. The apparatus of claim 14, wherein a halogen exit port releases halogen acids from the mixing, destabilizing and dehalogenating zone.

16. The apparatus of claim 13 further comprising a second rotatable reactor in fluid communication with the extruder and having at least three zones including a destabilizing and dehalogenating zone, a pyrolyzing zone and a devolatilizing zone.

17. The apparatus of claim 13, wherein the compressing zone compresses and dewaters the hydrocarbonaceous materials within the extruder by a combination of temperature increase, shear force, and evolution of steam.

18. The apparatus of claim 13, wherein the baffle dam comprises a cylindrical disc or plate.

* * * * *